US010412166B2

(12) United States Patent
Hanney et al.

(10) Patent No.: US 10,412,166 B2
(45) Date of Patent: Sep. 10, 2019

(54) HYBRID CLOUD INFORMATION MANAGEMENT SYSTEM

(71) Applicant: Presidio LLC, New York, NY (US)

(72) Inventors: Stephen Mark Hanney, Los Gatos, CA (US); Johan Milbrink, McLean, VA (US); Christopher Oarion Kreager, Bellingham, WA (US); Jason O'Brien, Austin, TX (US); Fabio Alberto Gutierrez, North Conway, NH (US)

(73) Assignee: Presidio LLC, New York, NY (US)

( * ) Notice: Subject to any disclaimer, the term of this patent is extended or adjusted under 35 U.S.C. 154(b) by 296 days.

(21) Appl. No.: 15/220,762

(22) Filed: Jul. 27, 2016

(65) Prior Publication Data

US 2017/0034274 A1 Feb. 2, 2017

Related U.S. Application Data

(60) Provisional application No. 62/203,786, filed on Aug. 11, 2015, provisional application No. 62/197,397, filed on Jul. 27, 2015.

(51) Int. Cl.
*H04L 29/08* (2006.01)
*H04L 12/24* (2006.01)
*G06F 16/11* (2019.01)

(52) U.S. Cl.
CPC ........ *H04L 67/1097* (2013.01); *G06F 16/116* (2019.01); *H04L 41/0843* (2013.01);
(Continued)

(58) Field of Classification Search
None
See application file for complete search history.

(56) References Cited

U.S. PATENT DOCUMENTS 8,364,638 B2 * 1/2013 Nickolov .............. G06F 9/4856
707/636
9,094,292 B2 * 7/2015 Tung ..................... G06F 9/5072
(Continued)

FOREIGN PATENT DOCUMENTS

WO 2014088544 6/2014

OTHER PUBLICATIONS

International Application No. PCT/US2016/044201, International Search Report and Written Opinion dated Oct. 21, 2016, 10 pages.
(Continued)

*Primary Examiner* — Scott B Christensen
(74) *Attorney, Agent, or Firm* — Kilpatrick Townsend & Stockton LLP

(57) ABSTRACT

A system may include a processor and a memory device having instructions executable by the processor to cause the processor to determine a list of available virtual data centers corresponding to pools of computing resources located on computing devices of service providers. The processor may receive a selection signal via a network from a computing device of a client corresponding to the client's selection of a virtual data center from the list. The processor may subsequently receive additional selection signals corresponding to the client's selection of a template, customization components, and a network for the virtual resource. The processor may generate the virtual resource according to the template customization components, and the network, and may provision the virtual resource on the selected virtual data center.

19 Claims, 17 Drawing Sheets

(52) U.S. Cl.
CPC .......... *H04L 41/5048* (2013.01); *H04L 67/02* (2013.01); *H04L 67/10* (2013.01); *H04L 41/22* (2013.01); *H04L 41/5054* (2013.01); *H04L 41/5096* (2013.01)

(56) References Cited

U.S. PATENT DOCUMENTS

| | | |
|---|---|---|
| 2009/0300719 A1* | 12/2009 | Ferris .................... G06F 21/606 726/3 |
| 2010/0293269 A1 | 11/2010 | Wilson et al. |
| 2012/0084113 A1 | 4/2012 | Brandwine et al. |
| 2012/0151358 A1 | 6/2012 | Joanny et al. |
| 2012/0303807 A1* | 11/2012 | Akelbein ............ G06F 11/3006 709/224 |
| 2013/0019011 A1 | 1/2013 | Breitgand et al. |
| 2013/0066940 A1 | 3/2013 | Shao |
| 2014/0181677 A1 | 6/2014 | Brandwine et al. |
| 2014/0280494 A1 | 9/2014 | Samoylenko et al. |
| 2014/0337467 A1 | 11/2014 | Pech et al. |
| 2015/0101057 A1 | 4/2015 | Fingold et al. |

OTHER PUBLICATIONS

International Application No. PCT/US2016/044208, International Search Report and Written Opinion dated Oct. 21, 2016, 14 pages.

\* cited by examiner

HYBRID CLOUD INFORMATION MANAGEMENT SYSTEM

CROSS-REFERENCE TO RELATED APPLICATIONS

This claims priority to U.S. Provisional Application Ser. No. 62/197,397, filed Jul. 27, 2015 and titled "Hybrid Cloud Management System," and to U.S. Provisional Application Ser. No. 62/203,786, filed Aug. 11, 2015 and titled "Hybrid Cloud Ecosystem Consumption Model," the contents of each of which are incorporated herein by reference.

TECHNICAL FIELD

The present disclosure relates to cloud computer networks, and more particularly, though not necessarily exclusively, to information-security management in hybrid cloud networks.

BACKGROUND

A hybrid cloud is an interaction between private and public clouds. Virtual computing resources may be orchestrated between the private and public clouds to provide services to clients of the hybrid cloud. The private cloud may include a platform designed for use by a single client. The public cloud may include a platform having computing resources shared between multiple clients. A client may provision virtual resources available on the hybrid cloud to obtain services from a service provider within the private cloud or the public cloud. The virtual resources may correspond to implementations of physical resources available on a computing device of the service provider. But, creating and provisioning a virtual resource may present information-security issues with respect to the placement and use of the virtual resource in a shared, hybrid cloud environment.

SUMMARY

In some aspects, a system may include a processor communicatively couplable to a client-computing device corresponding to a client and one or more computing devices corresponding to one or more service providers. The system may also include a memory device accessible to the processor and including instructions executable by the processor to cause the processor to determine a list of available virtual data centers corresponding to pools of computing resources located on the one or more computing devices. Each of the available virtual data centers may include a capacity to provision a virtual resource corresponding to a physical resource located on a provider-computing device of one or more computing devices. The instructions may also be executable by the processor to cause the processor to receive a first selection signal corresponding to a first selection of a selected virtual data center from the list of available virtual data centers. The instructions may also be executable by the processor to cause the processor to generate, subsequent to receiving the first selection signal, the virtual resource having parameters corresponding to an operating system template and a network configuration selected by the client and compatible with the provider-computing device. The instructions may also be executable by the processor to cause the processor to transform the selected virtual data center to include the virtual resource by partitioning the physical resource located on the provider-computing device for secure use by the client from the client-computing device. The physical resource may have a size selected by the client and within the capacity of the selected virtual data center.

In some aspects, a method for provisioning a secure virtual resource in a hybrid cloud environment may include receiving, from a client-computing device corresponding to a client of the hybrid cloud environment, a first selection signal corresponding to a first selection of a virtual data center from a list of available virtual data centers corresponding to pools of computing resources located on one or more computing devices corresponding to one or more service providers. The method may also include, subsequent to receiving the first selection signal, generating, by a processor, the secure virtual resource having parameters corresponding to an operating system template and a network configuration selected by the client via the client-computing device and compatible with a provider-computing device of the one or more computing devices corresponding to a service provider of the one or more service providers. The method may also include transforming the virtual data center to include the secure virtual resource by partitioning a computing resource located on the provider-computing device for secure use by the client from the client-computing device. The computing resource may have a size selected by the client via the client-computing device.

In some aspects, a system may include a means for determining a list of available virtual data centers for provisioning a virtual resource. The list of available virtual data centers may correspond to pools of computing resources located on one or more computing devices of one or more service provides. Each of the available virtual data centers may include a capacity to provision a virtual resource corresponding to a physical resource located on a provider-computing device of one or more computing devices. The system may also include means for transforming a selected virtual data center from the list of available virtual data centers to include the virtual resource by partitioning the physical resource for secure use by a client from a client-computing device in response to a first selection signal corresponding to a first selection of the selected virtual data center and additional selection signals received subsequent to the first selection signal and corresponding to additional selections of a template, customization components, and a network for the virtual resource. Options from which the additional selections chosen by the client may be tailored to parameters defined by the selected virtual data center and compatible with the physical resource located on the provider-computing device.

DETAILED DESCRIPTION

Figure 1:
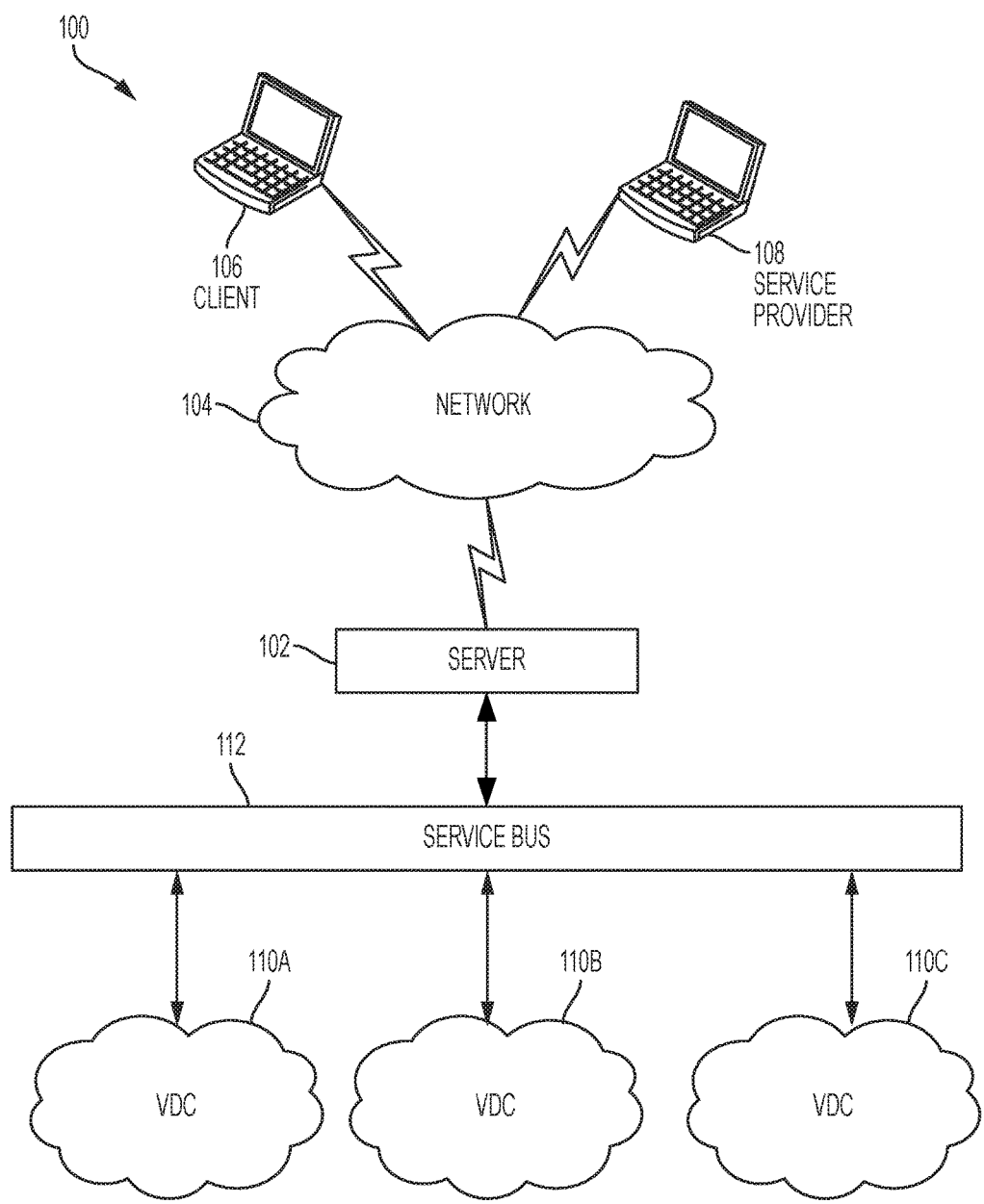
FIG. 1 is a block diagram depicting a cloud-computing environment according to some aspects of the present disclosure.

Certain aspects and features relate to controlling the creation, placement, and use of virtual resources on disparate virtual systems from a remote location to provide security of information in a hybrid cloud environment. Non-limiting examples of a virtual resource may include a configurable network, processor, storage, virtual machine, and services. In some aspects, a server device may operate as a centralized coordinator to coordinate creating and provisioning a virtual resource having parameters selected by a client of a hybrid cloud. The server device may maintain an inventory of virtual data centers available in the hybrid cloud to host a virtual resource. The virtual data centers may correspond to physical data centers located on computing devices of a service provider. The service providers may provide virtual implementations of physical resources though the hybrid cloud for selection and use by clients of the hybrid cloud. Maintaining an inventory of the virtual data centers may allow the client to select a desired virtual data center prior to creating the virtual resource. Subsequent to receiving a selection of a virtual data center, the server device may tailor the parameters of the virtual resource to the available inventory of a selected virtual data center.

In some aspects, the server device may be communicatively coupled to one or more virtual data centers via a service bus. The virtual resources generated by the server device may be secured using a proprietary service bus that may restrict access to the virtual data centers and the virtual resources provisioned in the virtual data centers by the clients and the service providers. For example, the server device may be a gateway to the virtual resources to ensure that the virtual resources available via the hybrid cloud from the service provider as well as their use by the client are sanctioned. In additional aspects, the server device may allow the client to passively or actively manage the use of the virtual resources from a remote location via the network and the service bus to ensure such use is in accordance with the policies and safeguards established by the client. Passively managing the virtual resources may include overseeing the control of the characteristics, consumption, and health of the virtual resources across the virtual data centers. Actively managing the virtual resources may include modifying the characteristics or operations of the virtual resource. The server device may allow the client to actively manage the virtual resources by executing requests from the client to modify a virtual resource. Examples of modifying a virtual resource may include turning the virtual resource on or off, extending the life of the virtual resource, cloning the virtual resource, restoring the virtual resource, and migrating the virtual resource to a different virtual data center.

The abundance of off-premise, cloud-based software and infrastructure resources may offer clients new ways to provide and procure information technology ("IT") internally. This may manifest itself both within and outside the control of IT, and may result in the potential for "shadow IT" (e.g., IT systems and solutions built and used inside organizations without explicit approval from the organization, solutions deployed by organizational departments other than an organization's IT department, etc.). Shadow IT may cause a loss of control or security, and may further cause a higher operational risk. As clients leverage new services, the challenges around managing this "hybrid IT" network environment grow rapidly given the multitude of resources and services both on- and off-premise heavily relied on by the client's end-users. A server device according to some aspects may reduce or eliminate shadow IT and provide the appropriate orchestration required to manage complex cloud environments. The server device may implement a self-service portal via a series of user interfaces to provide clients the ability to be an internal service provider in a controlled manner. The system may offer an intuitive self-service to procure virtual resources (e.g., virtual machines) quickly, securely, and efficiently via a proprietary service bus. This may provide clients centralized management of all of their cloud assets and may allow clients to extend a single-tenant private cloud environment to a hybrid cloud environment and leverage multi-tenant public cloud services to meet the organization's business demands without compromising the security of the client's information and resources.

Various aspects of the present disclosure may be implemented in various environments. FIG. 1 is a block diagram depicting a cloud-computing environment 100 according to some aspects of the present disclosure. The cloud-computing environment 100 includes a server device 102. The server device 102 may include any device capable of processing data or executing code. Examples of the server device 102 may include a database server, a web server, a personal computer, a handheld computing device, and a mobile device. The server device 102 may also represent a set of server devices. The server device 102 is communicatively coupled, via a network 104, to a client 106 and a service provider 108. The server device 102 may allow communication between the client 106 and virtual resources located in virtual data centers 110A, 110B, 110C. In some aspects, the client 106 may a computing device operated within an organization. In some aspects, the client 106 may be operated by an end-user (e.g., an IT employee at an organization) accessing virtual resources available on the virtual data centers 110A, 110B, 110C from a computing device (e.g., a personal computer, laptop, personal computer, handheld computing device, mobile device, or other computing device). The client 106 may represent a single client or may represent multiple clients.

The service provider 108 may include a vendor or other entity providing the virtual resources available to the client on the virtual data centers 110A, 110B, 110C. The services may be provided under one or more delivery models. For example, the service provider 108 may provide software as a service (SaaS) by hosting software applications running at a computing device of the service provider 108 and allowing the client 106 to subscribe to access the applications through a virtual data center 110A, 110B, 110C. The service provider 108 may additionally or alternatively provide IaaS (e.g., infrastructure as a service) by hosting equipment, such as servers, storage, or network components, and allowing the client 106 to subscribe to interact with the infrastructure of the service provider 108. In further aspects, the service provider 108 may provide platform as a service (PaaS) where the computing resource includes a platform allowing the client 106 to develop, run, and manage applications over the network 104.

The virtual data centers 110A, 110B, 110C may be cloud environments. For example, the virtual data centers 110A, 110B, 110C may be public clouds maintained on the Internet, private clouds maintained on a private network, or hybrid clouds including both public cloud and private cloud options. The server device 102 may be communicatively coupled to the virtual data centers 110A, 110B, 110C through a service bus 112. The service bus 112 may allow the server device 102 to generate, provision, and manage virtual resources on the disparate virtual data centers 110A, 110B, 110C from a single location in a secure manner. Each of the virtual data centers 110A, 110B, 110C may include independent software platforms and functionalities that may be integrated through software in the server device 102 to cause the server device 102 to generate user interfaces to allow the client 106 to access and manage the virtual resources located in any of the virtual data centers 110A, 110B, 110C via the network 104.

In some aspects, the server device 102 may communicate with the virtual data centers 110A, 110B, 110C to obtain real-time information regarding the available resources in each of the virtual data centers 110A, 110B, 110C. In additional aspects, the client 106 may communicate with the virtual data centers 110A, 110B, 110C indirectly through the one or more user interfaces generated by the server device 102. In some aspects, the server device 102 may be proprietary and allow the client 106 access to the virtual data centers 110A, 110B, 110C only through the server device 102. The server device 102 may allow the client 106 to generate and provision virtual resources on one or more of the virtual data centers 110A, 110B, 110C based on availability information and parameter information provided to server device 102 by the virtual data centers 110A, 110B, 110C.

Figure 2:
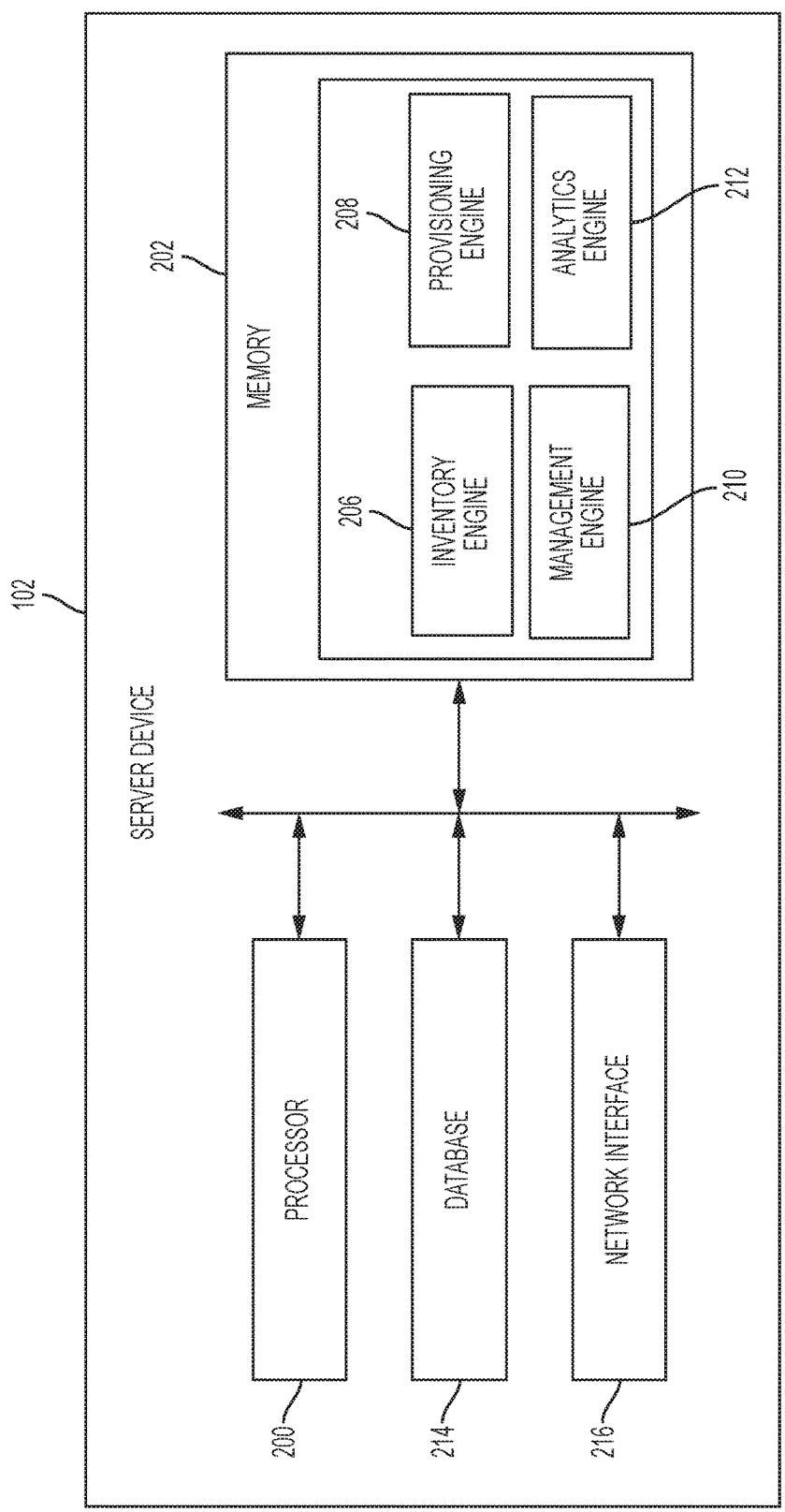
FIG. 2 is a block diagram depicting the server device of FIG. 1 according to some aspects of the present disclosure.

FIG. 2 is a block diagram depicting an example of the server device 102 of FIG. 1 according to some aspects of the present disclosure. The server device 102 includes a processor 200 and a memory 202. The processor 200 and the memory 202 may be communicatively coupled via a bus or other suitable connection means. The processor 200 may include a single processing device or multiple processing devices. Non-limiting examples of the processor 200 include a field-programmable gate array, an application-specific integrated circuit ("ASIC"), and a microprocessor. The processor 200 may execute instructions stored in the memory 202 to perform the operations of the server device 102. The memory 202 includes a storage device that retains information when powered off. Non-limiting examples of the memory 202 include electrically erasable and programmable read-only memory, a flash memory, or any other type of non-volatile memory. In some aspects, at least a portion of the memory 202 may include a computer-readable medium from which the processor 200 can read the instructions. A computer-readable medium may include electronic, optical, magnetic, or other storage devices capable of providing the processor 200 with computer-readable instructions or other program code. Non-limiting examples of a computer-readable medium include, but are not limited to, magnetic disks, memory chips, ROM, random-access memory ("RAM"), an ASIC, a configured processor, optical storage, or any other medium from which a compute processor can read the instructions. The instructions may include processor-specific instructions generated by a compiler or an interpreter from code written in any suitable computer-programming language, including, for example, C, C+++, Java, etc. In some aspects, the instructions may include program engines, such as, but not limited to, an inventory engine 206, a provisioning engine 208, a management engine 210, and an analytics engine 212.

The inventory engine 206 may include instructions to cause the processor 200 to retrieve and maintain an inventory of the virtual data centers 110A, 110B, 110C of FIG. 1 to determine an amount of available space in each. In some aspects, the inventory engine 206 may be executed by the processor 200 in response to a request for a virtual resource received from the client 106. In other aspects, the inventory engine 206 may continuously monitor the inventory of the virtual data centers 110A, 110B, 110C. The provisioning engine 208 may include instructions to cause the processor 200 to generate a virtual resource and provision the virtual resource in a virtual data center 110A, 110B, 110C selected by the client 106. The provisioning engine 208 may generate the virtual resource according to parameters selected by the client 106. In some aspects, the provisioning engine 208 may be executed by the processor 200 in response to a request from the client 106 to provision a virtual resource. In additional and alternative aspects, the provisioning engine 208 may include instructions to generate user interfaces including selection options and input options to facilitate selecting the parameters of the virtual resource.

The management engine 210 may include instructions to cause the processor 200 to modify virtual resources provisioned in the virtual data centers 110A, 110B, 110C of FIG. 1. Non-limiting examples of modifications for the virtual resources include turning the virtual resource on or off, extending the life of the virtual resource, cloning the virtual resource, restoring the virtual resource, migrating the virtual resource to a different virtual data center 110A, 110B, 110C, and deleting the virtual resource. In some aspects, the management engine 210 may be executed by the processor in response to a request by the client 106 to modify a virtual resource. The analytics engine 212 may include instructions to cause the processor 200 to track consumption of the virtual resource. In some aspects, the analytics engine 212 may store usage information corresponding to each virtual resource in the virtual data centers 110A, 110B, 110C, store the information in a database 114, and analyze the information to determine patterns and trends in the usage. In additional aspects, the analytics engine 212 may generate user interfaces including reports having graphs, charts, and other indicators of consumption of the virtual resources.

The database 214 may be communicatively coupled to the processor 200 and the memory 202 via the bus. The database 214 may represent a single database or multiple databases. The database 214 may include one or more memory locations or other storage means for storing information received from the client 106 and the service provider 108, as well as information generated by the processor 200. A network interface 216 may be communicatively coupled to the processor 200 and the memory 202 via the bus. The network interface 216 may include a network card or other device communicatively coupled to the network 104 of FIG. 1 to allow the client 106 or the service provider 108 to access the server device 102 and the virtual data centers 110A, 110B, 110C via the server device 102. In some aspects, the network interface 216 may transmit user interfaces generated by the processor 200 via the network 104 of FIG. 1 to the client 106 or the service provider 108. The network interface 216 may convert the user interfaces into electronic signals and transmit the signals to computing devices corresponding to the client 106 and the service provider 108 where the signals are converted back to the user interfaces for display. The network interface 216 may also receive information from the client 106 or the service provider 108. The information may be received as electronic signals and converted by the network interface 218 to a format usable by the server device 102.

Figure 3:
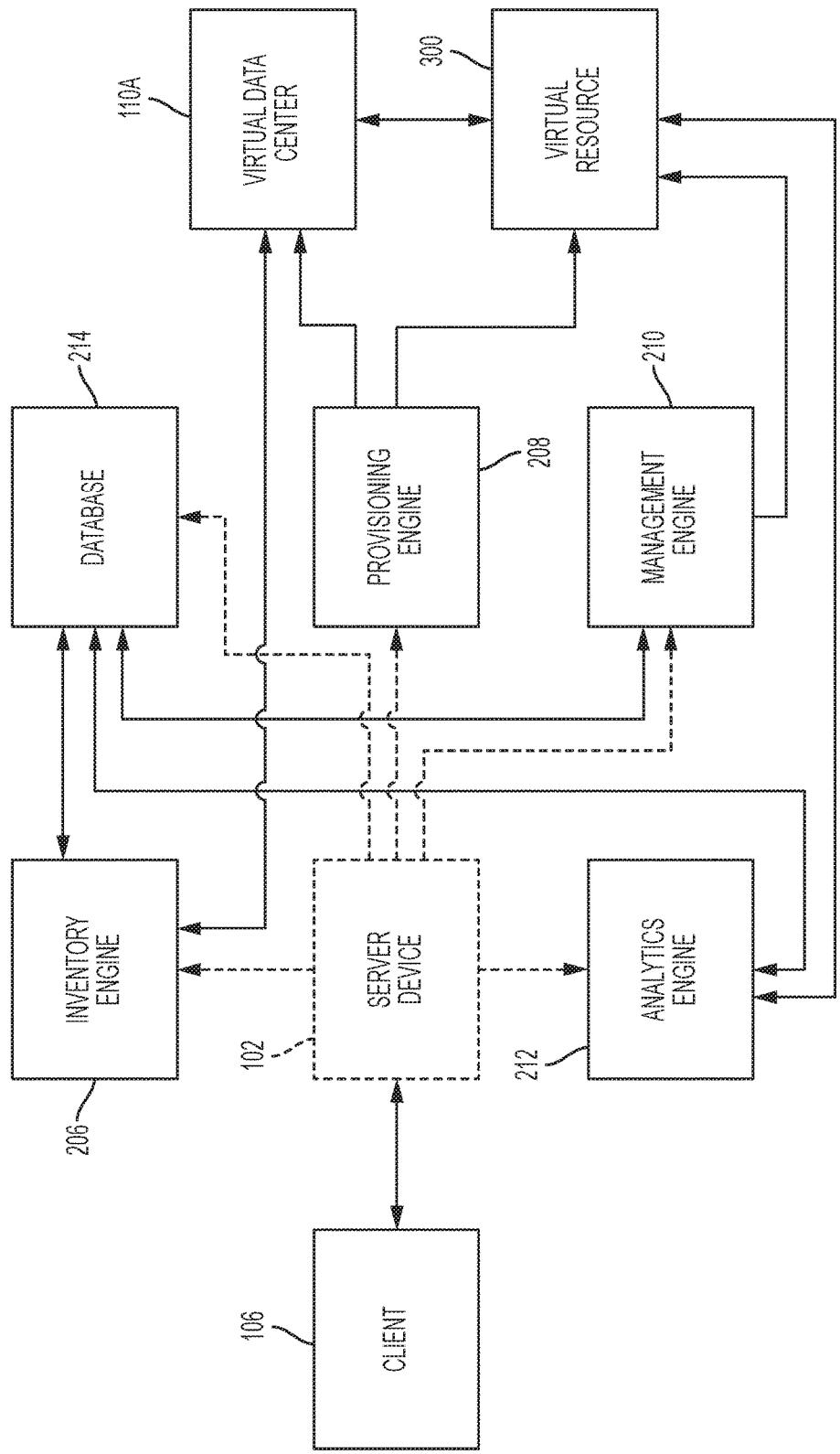
FIG. 3 is a block diagram depicting a flow of data between a client and a virtual data center in the cloud-computing environment of FIG. 1 according to some aspects of the present disclosure.

FIG. 3 is a block diagram depicting a flow of data between the client 106 and a virtual data center 110A in the cloud-computing environment of FIG. 1 according to some aspects of the present disclosure. The server device 102 may be an intermediary between the client 106 and one or more of the virtual data centers 110A, 110B, 110C to allow the client 106 to provision a virtual resource 300 on one or more of the virtual data centers 110A, 110B, 110C. The server device 102 may execute, through the processor 200, the engines 206, 208, 210, 212 included in the instructions of the memory 202 of the server device 102 of FIG. 2. In some aspects, the inventory engine 206 of the server device 102 may request inventory information from the virtual data center 110A. The inventory information may correspond to an amount of space or an amount of resources available in the virtual data database 110A. The inventory engine 206 may store the inventory information in the database 214. In some aspects, the inventory engine 206 may communicate, continuously or systematically, with the virtual data center 110A to obtain the inventory information. In other aspects, the inventory engine 206 may communicate with the virtual data center 110A in response to a request from the client 106 to generate and provision the virtual resource 300.

The provisioning engine 208 may be executed by the processor of the server device 102 in response to the request for the virtual resource 300 from the client 106. The provisioning engine 208 may communicate with the virtual data center 110A to obtain parameter information corresponding to the virtual data center 110A and may tailor the list of available parameters available to the client 106 for the virtual resource 300 based on the parameter information. In some aspects, the provisioning engine 208 may be executed by a processor of the server device 102 to generate user interfaces to receive additional information from the client 106 regarding the parameters for the virtual resource 300. Subsequent to receiving selections of parameter information from the client 106, the provisioning engine 208 may generate the virtual resource 300 and communicate with the virtual data center 110A to provision the virtual resource in the virtual data center 110A.

The management engine 210 may communicate with the virtual resource 300 to modify the virtual resource 300 in response to a request from the client 106 to modify the virtual resource 300. The client 106 may transmit modification information to the server device 102. The management engine 210 may be executed by the processor of the server device 102 to modify the virtual resource 300 according to the modification information. In some aspects, the management engine 210 may store a record of the modifications made to the virtual resource 300 in the database 214. The analytics engine 212 may communicate with the virtual resource 300, or otherwise monitor the virtual resource 300, to receive consumption information corresponding to the use of the virtual resource 300 by the client 106. In some aspects, the analytics engine 212 may also monitor modifications to the virtual resource 300 executed by the processor of the server device 102. In additional and alternative aspects, the analytics engine 212 may store consumption information in the database 214. Similarly, the analytics engine 212 may retrieve consumption information and modification information from the database 214 for generating reports analyzing the use of the virtual resource 300 over time.

Inventory Management

An inventory of the virtual data centers 110A, 110B, 110C may be managed to determine which virtual data centers 110A, 110B, 110C have the capacity to provision a virtual resource. The inventory may be managed by the server device 102, the inventory engine 206, or other means for managing an inventory of available virtual data centers 110A, 110B, 110C.

Figure 4:
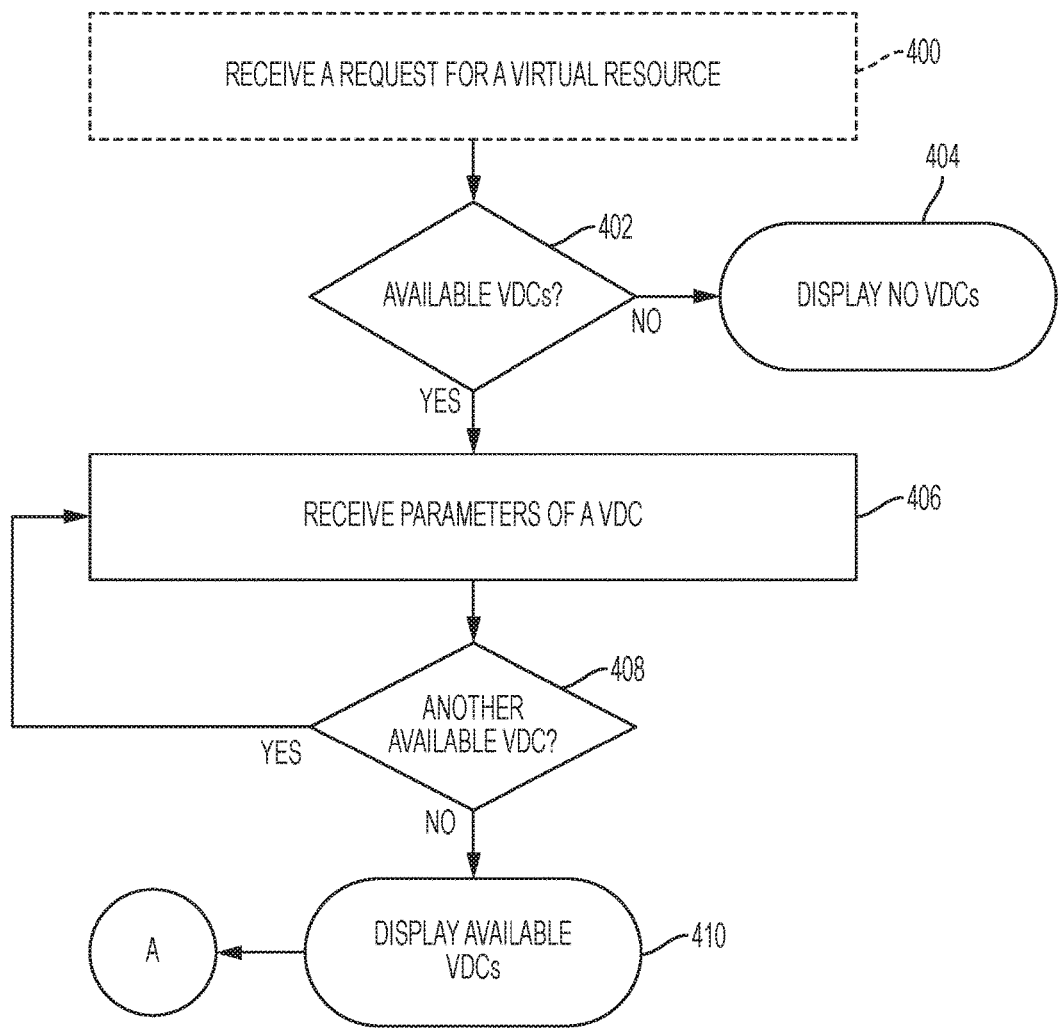
FIG. 4 is a flow chart of a process for managing an inventory of available virtual data centers according to some aspects of the present disclosure.

FIG. 4 is a flow chart of a process for managing an inventory of available virtual data centers 110A, 110B, 110C according to some aspects of the present disclosure. The process is described with respect to FIGS. 1-3, though other implementations are possible without departing from the scope of the present disclosure.

In block 400, the server device 102 may receive a request for a virtual resource from the client 106. In some aspects, the request may be received in response to a selection of an option on a user interface generated by the server device 102. For example, the server device 102 may provide a portal accessible to the client 106 for creating, provisioning, and managing virtual resources. The server device 102 may generate user interfaces for the portal corresponding to generating, provisioning, and managing the virtual resources. The user interface of the portal may include an option corresponding to the request for a virtual resource. The request may be received by the server device 102 via a signal generated in response to the selection of the option. In other aspects, the step of the process described in block 400 may be an option step, as indicated by the dashed block in FIG. 4. For example, the server device 102 may manage the inventory of the virtual data centers 110A, 110B, 110C on a continuous or systematic basis (e.g., performing the steps of the process in blocks 402-408 periodically) to maintain a current record of the available inventory in the virtual data centers 110A, 110B, 110C. In this regard, the server device 102 may maintain a real-time record of the availability of the virtual data centers 110A, 110B, 110C. An accounting or log of the availability of the virtual data centers 110A, 110B, 110C may be stored in the database 214 and accessed by the processor 200 of the server device 102 in response to receiving a request for a virtual resource from the client 106.

In block 402, the server device 102 determines whether one or more of the virtual data centers 110A, 110B, 110C are available to provision the virtual resource. In some aspects, this determination may be made in response to the server device 102 receiving the request from the client 106. For example, in response to receiving the signal generated in response to the selection of the option corresponding to the request for a virtual resource, the server device 102 may communicate with the virtual data centers 110A, 110B, 110C to request availability information corresponding to the availability of the virtual data centers 110A, 110B, 110C to host a virtual resource. In other aspects, determining the availability of the virtual data centers 110A, 110B, 110C may be in response to continuous or systematic communication between the server device 102 and the virtual data centers 110A, 110B, 110C. The server device 102 may receive the availability information from one of the virtual data centers 110A, 110B, 110C. In some aspects, the availability information may include information regarding the remaining capacity for virtual resources on the virtual data centers 110A, 110B, 110C. In other aspects, the availability information may include information regarding the resources currently included in or being utilized by the virtual data center 110A, 110B, 110C. The server device 102 may be able to determine whether the virtual data center 110A, 110B, 110C includes a capacity for the virtual resource based on information regarding the resource capacity of the virtual data center 110A, 110B, 110C that may be stored in the database 214 or other storage device accessible to the server device 102. The server device 102 may receive availability information regarding the resources currently being utilized by the virtual data center 110A, 110B, 110C and subtract a value corresponding to the current utilization of one of the virtual data center 110A, 110B, 110C from the resource capacity for that virtual data center 110A, 110B, 110C.

In block 404, in response to determining that none of the virtual data centers 110A, 110B, 110C has sufficient space to provision the virtual resource 300, in block 404, the server device 102 may generate a user interface for displaying a message or other indication that no virtual data centers 110A, 110B, 110C.

In block 406, in response to determining that a virtual data center 110A, 110B, 110C has sufficient space to provision the virtual resource 300, the server device 102 receives parameters for the virtual resource in response to determining that a virtual data center 110A, 110B, 110C is available for provisioning a virtual resource. In some aspects, the parameter information received by the server device 102 may be included in the availability information. In other aspects, the parameter information may be requested and received by the server device 102 in response to the determination that the virtual data center 110A, 110B, 110C is available. The parameter information may correspond to the parameters of a virtual resource that may be provisioned in the virtual data center 110A, 110B, 110C. The information may include, but may not be limited to, the operating systems available to the virtual resource in the virtual data center 110A, 110B, 110C, the networks available to the virtual resource, the available sizes for the virtual resources, software compatibility information for the virtual resource, etc. In some aspects, at least some of the parameter information may be determined by the server device 102. For example, the server device 102 may determine the sizes available for the virtual resource based on the availability information received from the virtual data center 110A, 110B, 110C.

In block 408, the server device 102 determines whether another of the one or more virtual data centers 110A, 110B, 110C is available for provisioning the virtual resource. The server device 102 may receive the availability information as described in block 402. The server device 102 may receive the parameters for the remaining available virtual data centers 110A, 110B, 110C as described in block 406.

In block 410, the server device 102 generates one or more user interfaces for displaying the available virtual data centers 110A, 110B, 110C to the client 106. The user interfaces may include selection options to allow the client 106 to select a virtual data center 110A, 110B, 110C for provisioning the virtual resource.

In some aspects, the inventory management process of FIG. 4 may allow one or more of the application program interfaces to generate a catalog accessible to the client 106 via the network 104. The catalog may include user interfaces generated by the server device 102, the inventory engine 206, or other means for generating the catalog. The catalog may include a database (e.g., database 214) that tracks the virtual resources, parameter information for the virtual resources, or availability information for the virtual data centers 110A, 110B, 110C.

Provisioning

In some aspects, the client 106 may wish to transform a virtual data center 110A, 110B, 110C to include a virtual resource by provisioning a virtual resource on a virtual data center 110A, 110B, 110C. Provisioning the virtual resource on a virtual data center 110A, 110B, 110C may include partitioning a portion of the service provider 108 including one or more physical resources corresponding to the virtual resource for use by the client 108 through the service bus 112. The service bus 112 may provide a secure connection between the client 106 and the service provider 108 through the server device 102. Virtual resources may be provisioned for the client 106 through the server device 102, the provisioning engine 208, or other means for transforming a virtual data center 110A, 110B, 110C determined by the inventory management process of FIG. 4 to include a virtual resource.

Figure 5:
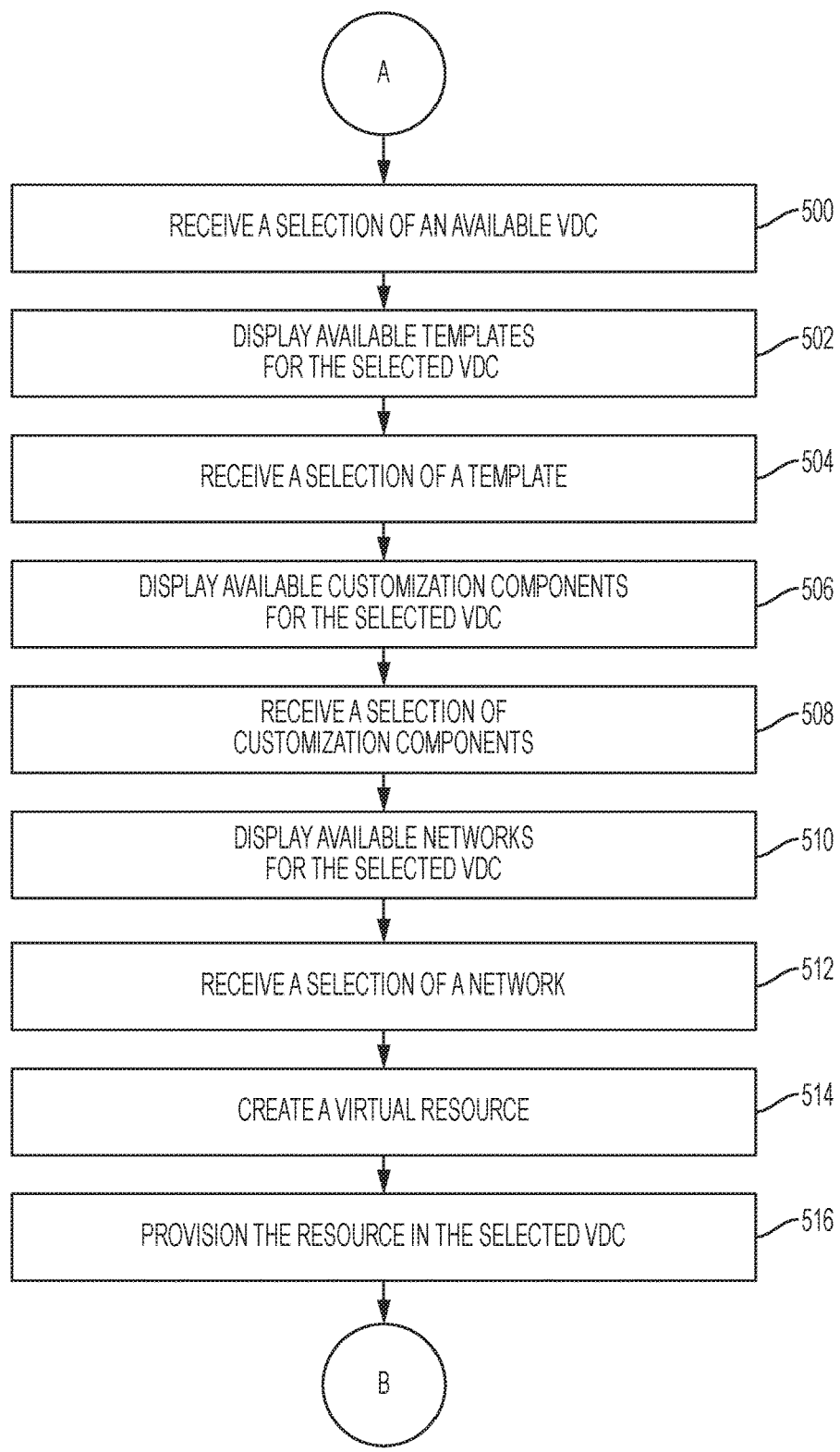
FIG. 5 is a flow chart of a process for provisioning a virtual resource in an available virtual data center according to some aspects of the present disclosure.

FIG. 5 is a flow chart of a process for provisioning the virtual resource 300 in an available virtual data center 110A, 110B, 110C according to some aspects of the present disclosure. The process is described with respect to FIGS. 1-3 as well as screenshots of example user interfaces, though other implementations are possible without departing from the scope of the present disclosure.

In block 500, the server device 102 receives a selection of an available virtual data center 110A, 110B, 110C for provisioning the virtual resource 300. In some aspects, the selection may include a signal generated by a computing device of the client 106 in response to a selection of a selection option selected by the client 106 corresponding to the virtual data center 110A, 110B, 110C. In some aspects, the signal may also include parameter information corresponding to the selected virtual data center 110A, 110B, 110C selected by the client 106. In other aspects, the server device 102 may identify the virtual data center 110A, 110B, 110C based on the selection signal and may retrieve parameter information associated with the selected virtual data center 110A, 110B, 110C in the database 214. In some aspects, the parameter information corresponding to the selected virtual data center 110A, 110B, 110C may include information corresponding to software and networks compatible with the virtual data center 110A, 110B, 110C, and available sizes for the virtual resource 300 based on the capacity of the selected virtual data center 110A, 110B, 110C.

Figure 6:
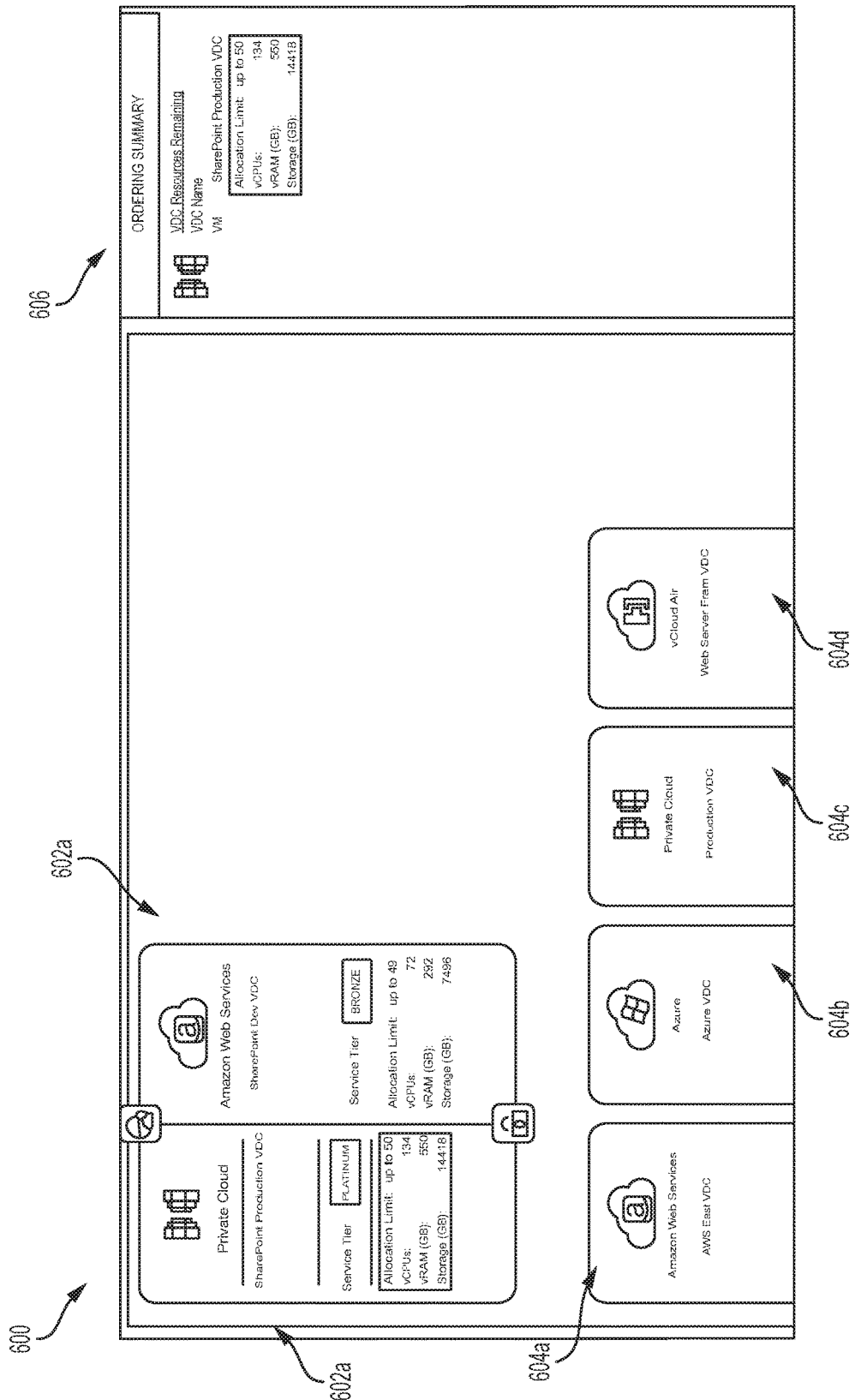
FIG. 6 is a screenshot of an example of a user interface including available virtual data centers according to some aspects of the present disclosure.

FIG. 6 is a screenshot of an example of a user interface 600 including available virtual data centers according to some aspects of the present disclosure. The user interface 600 may be generated by the processor 200 of the server device 102 executing instructions (e.g., the provisioning engine 208). The user interface 600 may be transmitted to the client 106 by the network interface 216 and through the network 104 to a computing device of the client 106 for display. The user interface 600 includes selection options 602a, 602b and selection options 604a, 604b, 604c, 604d corresponding to virtual data centers 110A, 110B, 110C available for provisioning the virtual resource. The selection options 602a, 602b are collectively defined by an icon corresponding to a hybrid cloud including both a private cloud corresponding to selection option 602a and a public cloud (labeled Amazon Web Services") corresponding to selection option 602b that may be selected by the client 106. The icon may indicate that a selection of one of the private cloud or the public cloud as the virtual data center 110A, 110B, 110C may cause the virtual resource 300 to be available on both the private cloud and the public cloud (e.g., available to the hybrid cloud). The selection options 604a, 604b, 604c, 604d correspond to private clouds and public clouds, individually, that may be selected by the client 106 as a virtual data center 110A, 110B, 110C to provision the virtual resource 300. The client 106 may select a selection option 602a, 602b, 604a, 604b, 604c, 604d corresponding to a desired virtual data center for the virtual resource.

The user interface 600 also includes an order summary 606 on a right side of the user interface 600. The order summary 606 may include a summary of the selections made by the client 106. For example, the order summary 606 in the user interface 600 includes availability information for the selected private cloud corresponding to the selection option 602a. In some aspects, the availability information may inform the client 106 whether there is sufficient space on the private cloud for a desired virtual resource 300.

Returning to FIG. 5, in block 502, the server device 102 generates the virtual resource 300. The virtual resource 300 may be generated based on parameters received from the client 106. In some aspects, the parameters selected by the client 106 may be tailored based on the selected virtual data center 110A, 110B, 110C. The parameters may be compatible with a physical resource located at the server provider 108 corresponding to the virtual resource 300. The server device 102 may generate one or more user interfaces including options for selecting or inputting the parameters. In some aspects, the parameters may include a template, customization components, and network configurations. In some aspects, the server device 102 may generate one or more user interfaces for displaying available templates for the virtual resource 300. The user interface may be generated in response to the selection of a selection option by the client 106 from a group of selection options displayed in a user interface, such as user interface 600.

Figure 7:
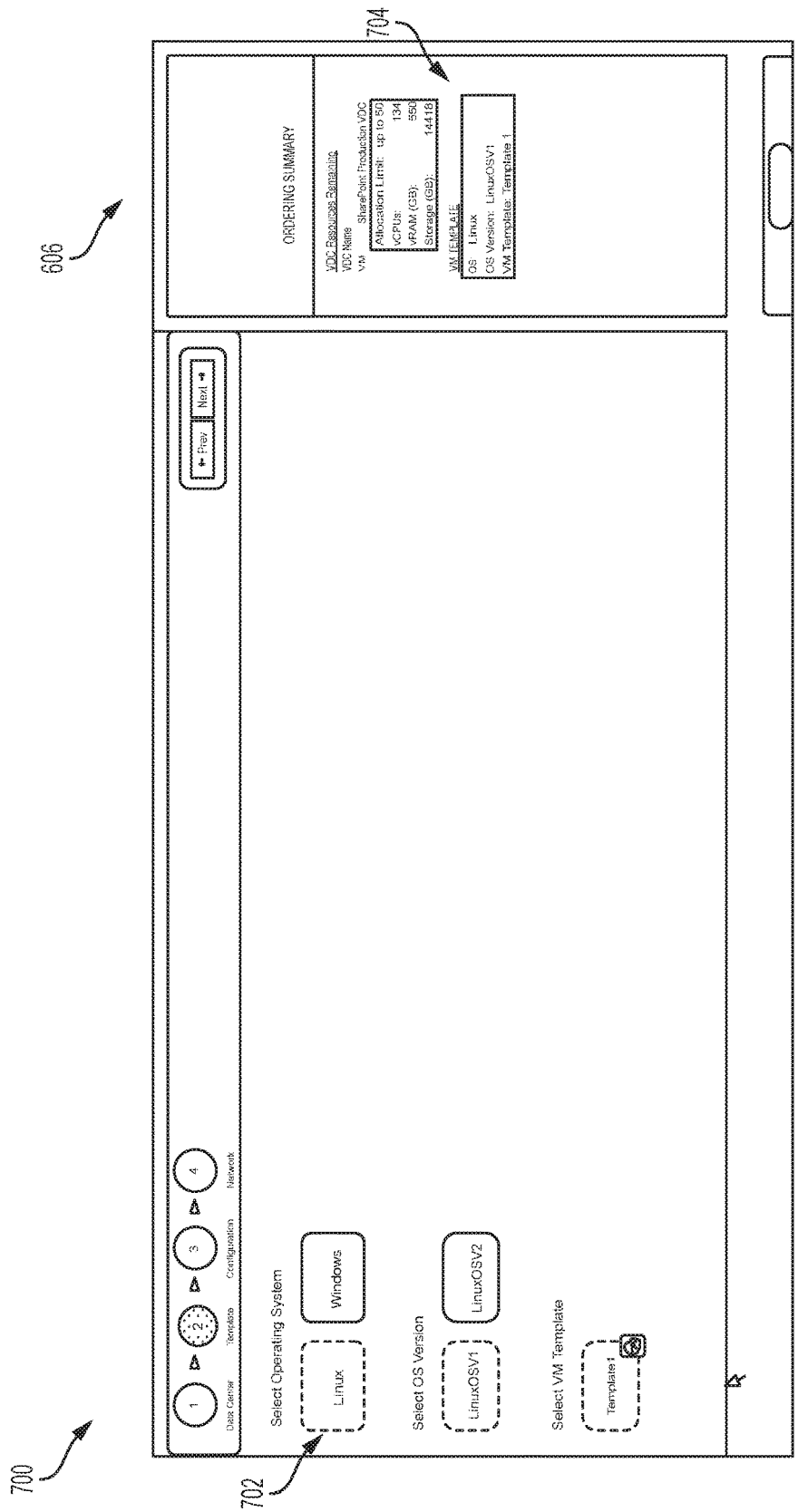
FIG. 7 is a screenshot of an example of a user interface including available templates for a selected virtual data center according to some aspects of the present disclosure.

FIG. 7 is a screenshot of an example of a user interface 700 including available templates for a selected virtual data center according to some aspects of the present disclosure. The user interface includes selection options 702 corresponding to available and compatible software for the virtual resource in the selected virtual data center 110A, 110B, 110C. The available templates may be determined and displayed in response to at least a portion of the parameter information received from the virtual data center 110A, 110B, 110C. In some examples, the template selection options may be displayed on a single user interface that allows the client 106 to select a template for the selection option. In other examples, the template selection options may be displayed on a series of user interfaces. For example, the client 106 may select of the selection options 702 corresponding to an available operating system for the virtual resource. The selection may cause the server device 102 to generate another user interface or modify the user interface 700 to display additional selection options 702 corresponding to versions of the selected operating system that are available for the virtual resource 300. The selection of a version may cause the server device 102 to generate another user interface or modify the user interface 700 to display the available templates based on the selected operating system and version. The user interface 600 also includes the order summary 606 shown in FIG. 6 with the summary information updated to reflect the template information 704 corresponding to the template for the virtual resource 300 selected by the client 106. The server device 102 may receive a selection of a template corresponding to the selection option selected by the client 106 for the template of the virtual resource. For example, in response to the selection of one of the template selection options shown in FIG. 7, the server device 102 may receive a signal corresponding to the template selected by the client 106 for the virtual resource.

In some aspects, the server device 102 may also generate a user interface for displaying customizable components of the virtual resource 300. In additional aspects, the user interface may be generated in response to the selection of a template. In some aspects, the customizable components may be based on the parameter information received from the selected virtual data center 110A, 110B, 110C. In other aspects, the customizable components may be received from the selected template information. For example, one of the customizable components may relate to the size of the virtual resource. The amount of space that may be consumed in the virtual data center 110A, 110B, 110C by the virtual resource in each size may depend on the operating system for the virtual resource (e.g., a virtual resource running on a Windows operating system may consume less space than a "virtual resource running on a Linux operating system, or vice versa). Other customizable components of the virtual resource 300 may include, but may not be limited to, a quantity of virtual resources having the same selected template, a name for the virtual resource, a decommissioning term corresponding to a time when the virtual resource is automatically removed from a virtual data center 110A, 110B, 110C, and a backup policy corresponding to an interval of time when characteristic information for the virtual resource is stored in the database 214. The customizable components may be represented by selection options or input options.

Figure 8:
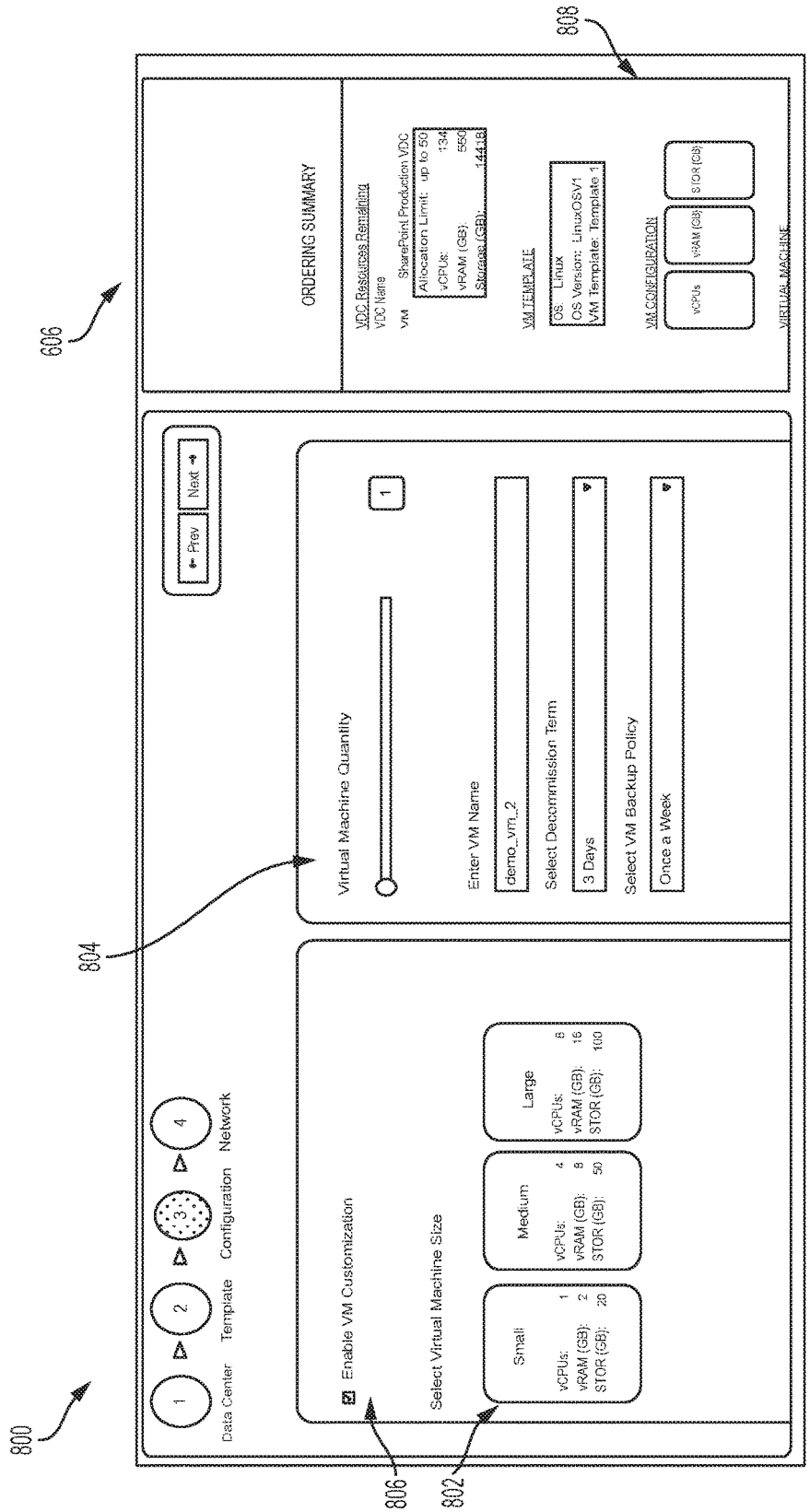
FIG. 8 is a screenshot of an example of a user interface including available customization components for a selected virtual data center according to some aspects of the present disclosure.

FIG. 8 is a screenshot of an example of a user interface 800 including available customization components for a selected virtual data center according to some aspects of the present disclosure. The user interface includes selection options 802 corresponding to sizes available for the virtual resource. For example, the selection options 802 correspond to a "small," "medium," and "large" and provide details on the parameters of each size within an icon corresponding to the selection option. The user interface also includes additional options 804, including a selection option (e.g., a slider) and an input option for the quantity of virtual resources, an input option for a customized name of for the virtual resource 300, and selection options for the decommissioning term and the backup policy (e.g., drop-down lists). Although only the size, quantity, name, decommissioning term, and backup policy are shown as customizable components in FIG. 8, any number, combination, and type of customizable components may be included in one or more user interfaces for customizing the virtual resource without departing from the scope of the present disclosure.

The user interface 800 also includes a selection option 806 to enable customizing the virtual resource 300. The selection option 806 may be disabled by the server device 102 in response to a selection by the client 106 of the selection option 806 to remove the checkmark from the selection option 806. In some aspects, the server device 102 may customize the virtual resource 300 based on a default setting stored as instructions in the memory 202 (e.g., one virtual resource 300 of a medium size). In other aspects, the server device 102 may determine the customization components of the virtual resource 300 based on historical information associated with the client 106 in the database 214 (e.g., previous virtual resources generated by the client 106). The selection options 802 and the additional option, 804 and input options may disappear, become inactive, or otherwise are disabled when the checkmark is removed or is otherwise not included in the checkbox. The user interface 800 also includes the order summary 606 updated with additional configuration information 808 corresponding to the customizable components selected by the client 106.

The server device 102 may receive the customization components selected by the client 106. For example, in response to the selection of one of the selection options 802 of FIG. 8 corresponding to the size of the virtual resource 300, the server device 102 may receive a signal corresponding to the selected size and transmit the signal to the server device 102 via the network 104. Similarly, in response to the input of a name for the virtual resource 300 into the input option shown in FIG. 8, the server device 102 may receive a signal corresponding to the characters entered by the client 106 into the input option.

In some aspects, the server device 102 may also generate a user interface for displaying one or more selection options or input options corresponding to available networks for the virtual resource. In some aspects, the user interface may be generated in response to the selection of customizable components for the virtual resource 300, as shown in FIG. 8. In other aspects, the user interface may be generated in response to the selection of a virtual data center 110A, 110B, 110C or template for the virtual resource, as shown in FIGS. 6 and 7, respectively.

Figure 9:
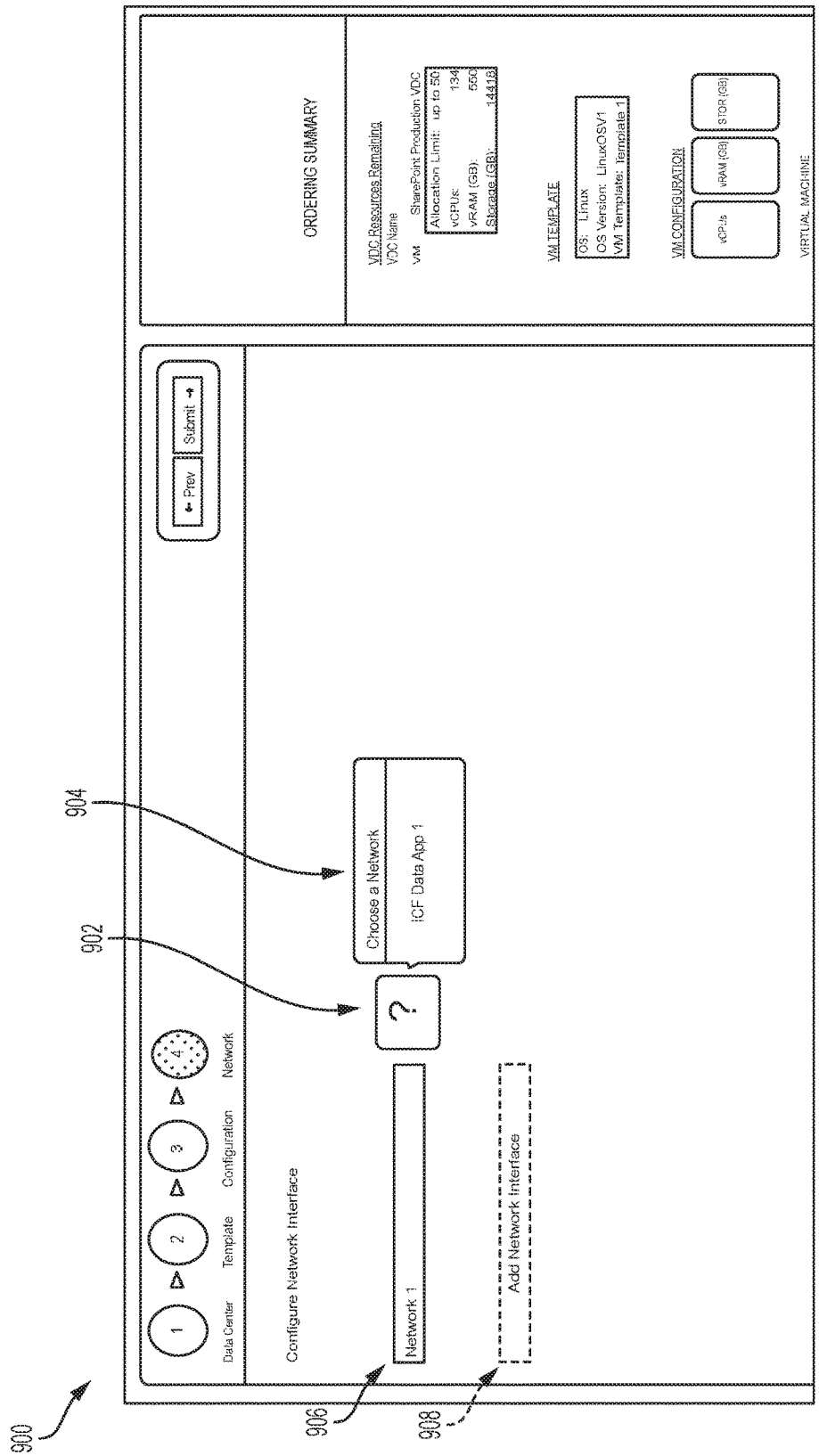
FIG. 9 is a screenshot of an example of a user interface including available networks for a selected virtual data center according to some aspects of the present disclosure.

FIG. 9 is a screenshot of an example of a user interface 900 including available networks for a selected virtual data center according to some aspects of the present disclosure. The user interface includes a selection option 902 for displaying a list of available networks for the virtual resource. In response to the selection of the selection option 902, the server device 102 may generate an additional user interface, or update the current user interface to display an additional selection option 904 to allow the client 106 to select a network for the virtual resource. The user interface 900 also includes an input option 906 that allows the client 106 to enter input corresponding to the name of a desired network interface for the virtual resource. The user interface 900 also includes an optional selection option 908 to allow the client 106 to add a new network interface not listed in the selection option 904.

In some aspects, the server device 102 may receive the selection of a network from the client 106 based on the selections or input made via the selection options or input options of the user interface 900 of FIG. 9. For example, in response to the selection and naming of a network in FIG. 9, the server device 102 may receive a signal corresponding to the selection. In some aspects, the server device 102 may compare the alphanumeric input with available network interfaces to determine the selected network interface.

The server device 102 may generate the virtual resource 300 based on the template, customizable components, and network selected by the client 106. In some aspects, the virtual resource 300 may be generated by the server device 102 assigning the selected template, customizable components, or network as attributes of the virtual resource 300. In additional aspects, generating the virtual resource may include establishing the necessary connections or software for the virtual machine to operate in the selected virtual data center 110A, 110B, 110C.

In block 504, the selected virtual data center 110A, 110B, 110C is transformed to include the virtual resource 300. In some aspects, the virtual data center 110A, 110B, 110C may be transformed by provisioning the virtual resource in the selected virtual data center 110A, 110B, 110C. In some aspects, the server device 102 may provision the virtual resource by partitioning the physical resource located at the service provider 108, and for which the virtual resource is an implementation, for use by the client securely via the service bus 112. The virtual resource 300 may operate in the virtual data center 110A, 110B, 110C based on the attributes (e.g., operating system, size, decommissioning terms, backup policy, etc.) selected by the client 106 and may be identified based on the name inputted by the client 106. In some aspects, the client 106 may access the virtual resource in the virtual data center 110A, 110B, 110C only through the server device 102. The client 106 may access the server device 102 via the network 104 and the server device 102 may operate as an intermediary between the client 106 and the virtual data center 110A, 110B, 110C where the virtual resource is provisioned by communicating with the virtual data center 110A, 110B, 110C via the service bus 112.

Life Cycle Management

In some aspects, the server device 102 may allow the client 106 to manage the virtual resources provisioned in the virtual data centers 110A, 110B, 110C during the life cycle of each virtual resource. In some aspects, the client 106 may manage the virtual resources via a portal available to the client 106 via the network 104. The server device 102 may allow the client 106 to passively manage the virtual resources by monitoring the characteristics and other information for the virtual resources in their respective virtual data center 110A, 110B, 110C. The server device 102 may further allow the client 106 to actively manage the virtual resources via the portal (e.g., change the operations, characteristics, or placement of the virtual resources).

Passive Management

Passive management of the virtual resources associated with a client may be performed by the server device 102, the analytics engine 212, or other means for analyzing the virtual resources associated with the client 106. In some aspects, one or more user interfaces may be generated for displaying information to the client 106 regarding the virtual resources generated or provisioned in one of the virtual data centers 110A, 110B, 110C for the client 106. For example, the user interfaces may allow the client 106 to see the characteristics of the virtual resources managed by the client 106.

Figure 10:
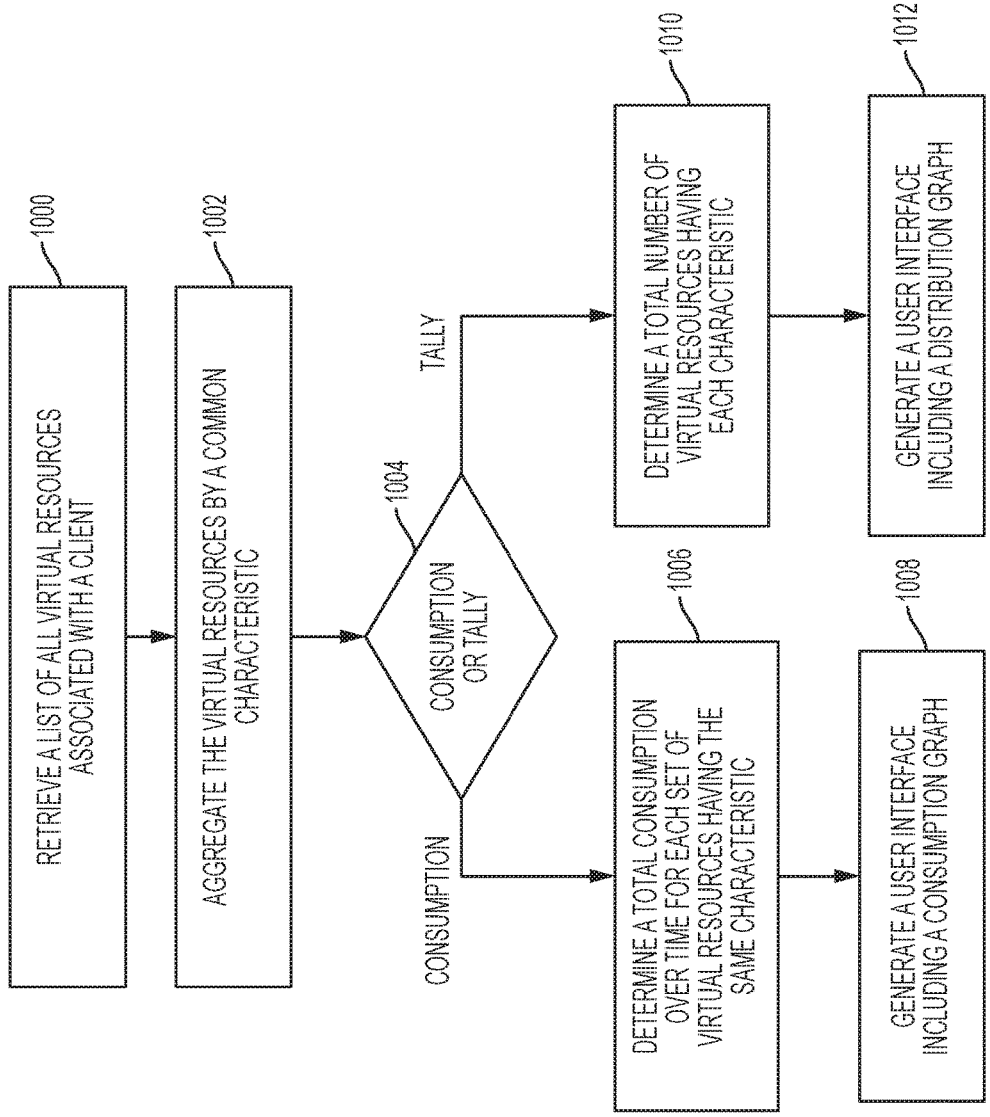
FIG. 10 is a flow chart of a process for analyzing the virtual resources provisioned on virtual data centers for a client according to some aspects of the present disclosure.

FIG. 10 is a flow chart of a process for analyzing the virtual resources provisioned on the virtual data centers 110A, 110B, 110C for a client. The process is described with respect to FIGS. 1-3, as well as screenshots of example user interfaces, though other implementations are possible without departing from the scope of the present disclosure.

In block 1000, a list of all of the virtual resources associated with a client is retrieved. In some aspects, the list is retrieved from the database 114. For example, the database 114 may include a client identifier corresponding to the client. The database 114 may also include a record of all of the virtual resources provisioned by the client on the virtual data centers 110A, 110B, 110C. The virtual resource records may include a link, marker, or other indicator to associate the client identifier with the virtual resources provisioned by the client in the database 114.

In block 1002, the virtual resources are aggregated by a common characteristic. In some aspects, the characteristics of the virtual resources may be included in the record retrieved from the database 114. Non-limiting examples of the characteristics may include the virtual data center 110A, 110B, 110C on which the virtual resource is provisioned, the operating system used by the virtual resource, and the service provider 108 associated with the virtual resource.

In block 1004, a decision is made on whether to analyze the consumption of the virtual resources for each aggregated group or to tally the virtual resources for each group. In some aspects, the determination may be made in response to a request for a graph or report corresponding to the consumption of the virtual resources or a tally of the virtual resources. In other aspects, the request may be for a graph or report corresponding to both the consumption and tally of the virtual resources.

In block 1006, in response to determining that the consumption of the virtual resources is to be analyzed, a total consumption over time for each set of virtual resources having the same characteristics is determined. For example, the total consumption over time may be totaled for a first set of virtual resources provisioned on a first virtual data center 110A and a total consumption over time may be totaled for a second set of virtual resources provisioned on a second virtual data center 110B.

In block 1008, a user interface may be generated that includes a consumption graph illustrating the consumption for one or more of the sets of virtual resources having a common characteristic over time. Examples of a consumption graph may include one or more bar graphs, line graphs, pie charts, circle graphs, or histograms.

In block 1010, in response to determining that a tally of the virtual resources be analyzed, the total number of virtual resources having a common characteristic is determined. For example, the total number of virtual resources provisioned for the client in each of the virtual data centers 110A, 110B, 110C may be separately tallied.

In block 1012 a user interface may be generated that includes a distribution graph illustrating the totals for one or more of the sets of virtual resources having a common characteristic at a snapshot in time. Examples of a distribution graph may include one or more bar graphs, line graphs, pie charts, circle graphs, or histograms.

Figure 11:
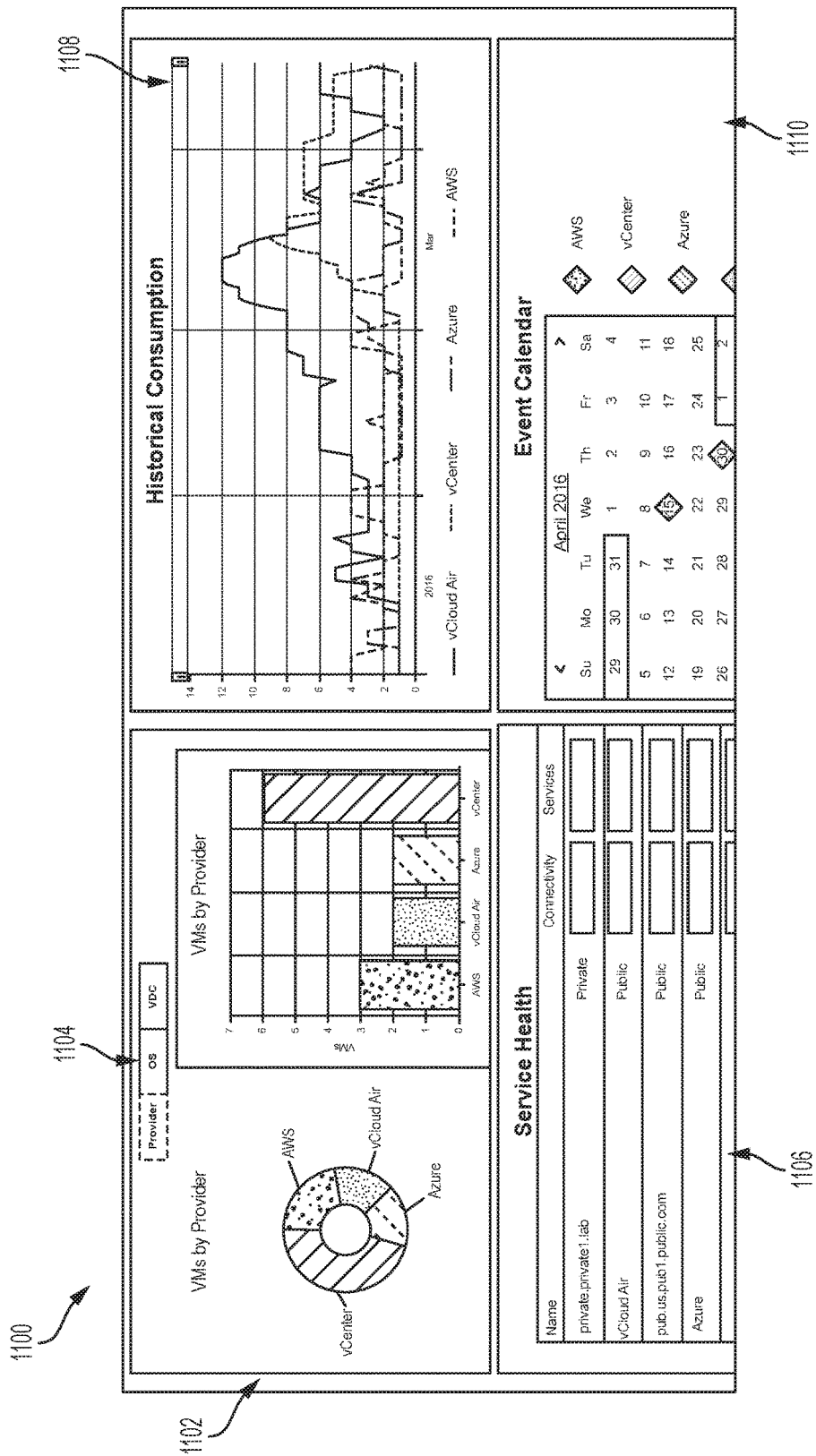
FIG. 11 is a screenshot of an example of a user interface displaying a high-level summary of characteristics of virtual resources associated with a client according to some aspects of the present disclosure.

FIG. 11 shows one example of a user interface 1100 generated by the server device 102 and displaying a high-level summary of the characteristics of the virtual resources managed by the client 106.

The user interface 1100 includes four quadrants corresponding to characteristics of the virtual resources managed by the client 106. In quadrant 1102, the user interface 1100 shows a snapshot in time with respect to an allocation of the virtual resources across all service providers 108 being used to host the virtual resources. The quadrant 1102 includes multiple graphs, including a circle graph and a bar graph. Each graph shows the relative distribution of the virtual resources for each provider. In some aspects, the server device 102 may generate user interfaces showing the allocation in alternative views. For example, the quadrant 1102 includes a selection option 1104 to allow the client to toggle between various reporting of the allocation of the virtual resources. The selection option 1104 includes an option to view the allocation of resources by provider, by operating system ("OS"), or by virtual data center 110A, 110B, 110C ("VDC").

Figure 12:
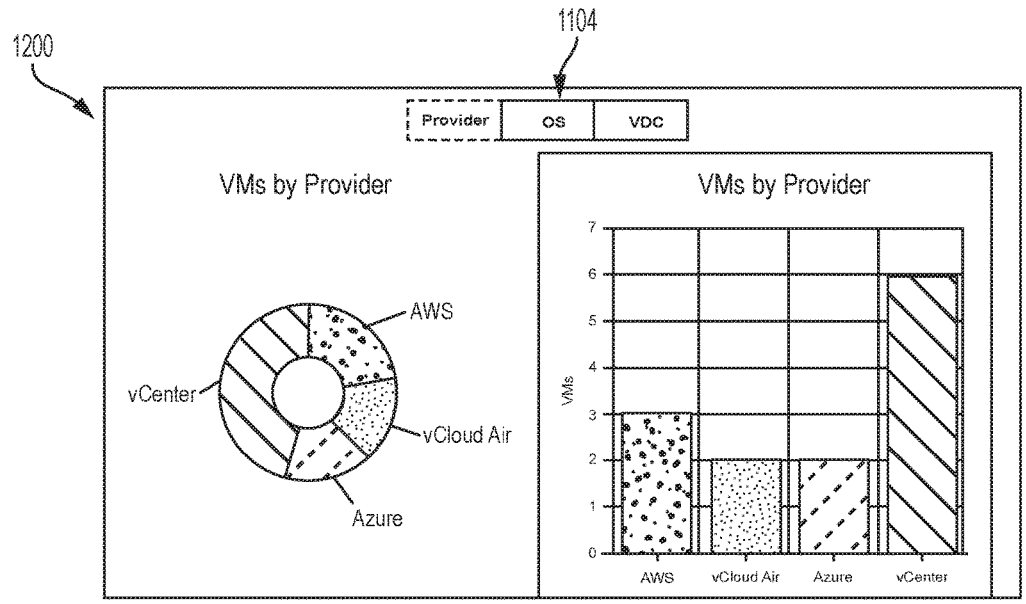
FIG. 12 is a screenshot of an example of a user interface showing an allocation of virtual resources of a client by the service provider hosting each virtual resource according to some aspects of the present disclosure.
Figure 13:
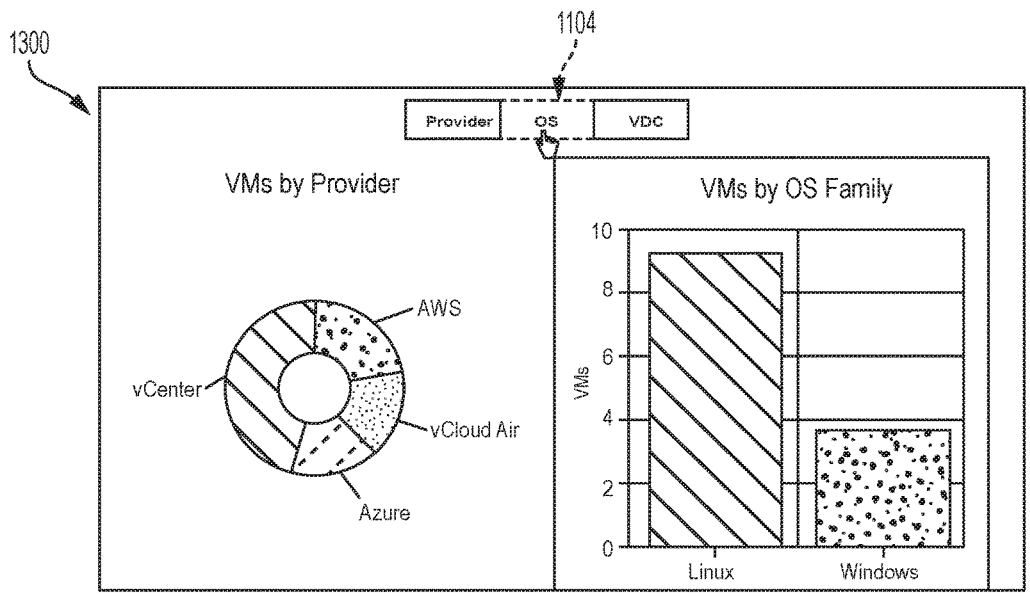
FIG. 13 is a screenshot of an example of a user interface showing an allocation of virtual resources of a client by the operating system associated with each virtual resource according to some aspects of the present disclosure.
Figure 14:
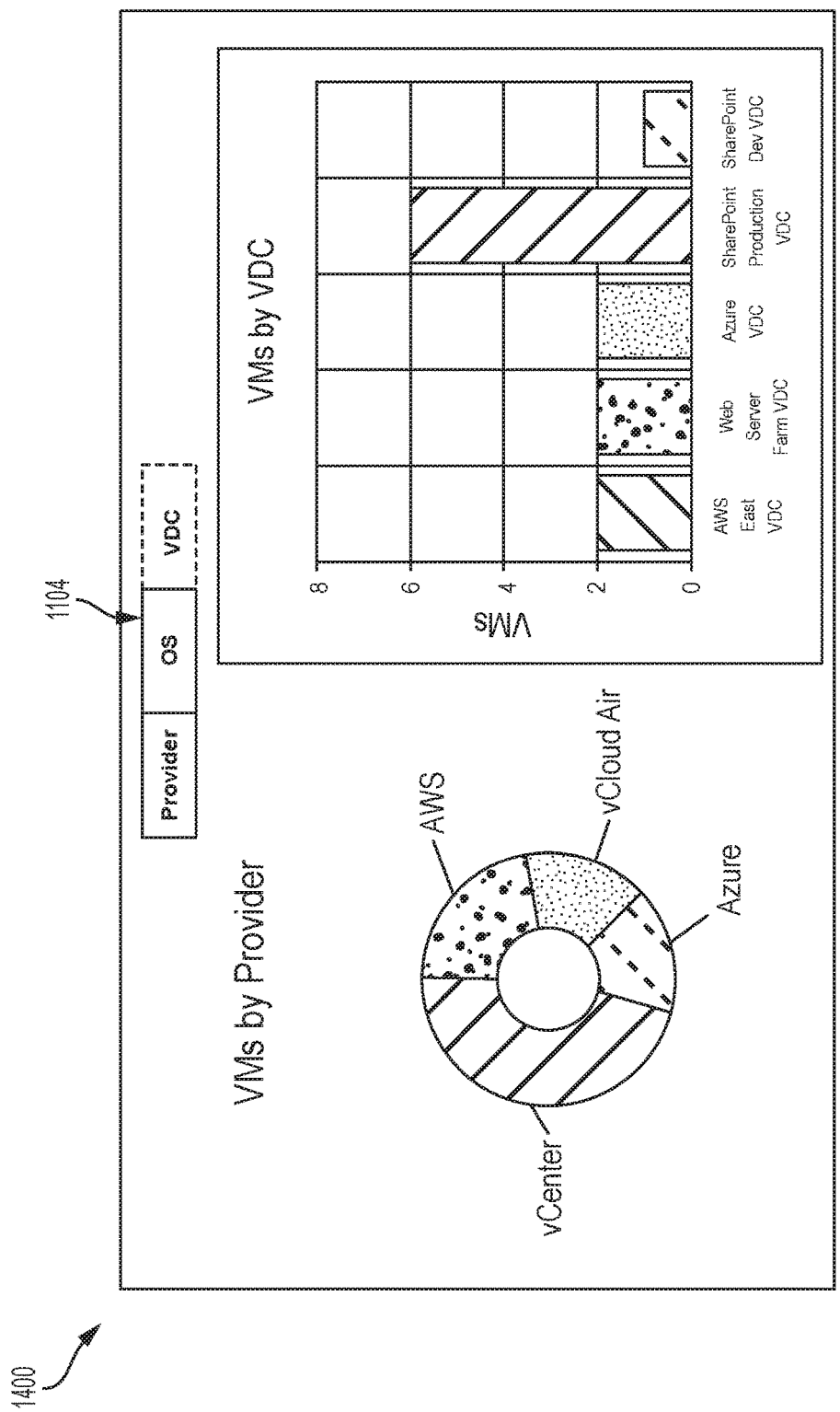
FIG. 14 is a screenshot of an example of a user interface showing an allocation of virtual resources of a client by the virtual data center on which each virtual resource is provisioned according to some aspects of the present disclosure.

FIGS. 12-14 show the user interfaces corresponding to each view that may be positioned in the quadrant 1102 of the user interface 1100 of FIG. 11. FIG. 12 is a screenshot of an example of a user interface 1200 showing an allocation of the virtual resources of the client 106 by the service provider 108 hosting the virtual resource. In some aspects, the user interface 1200 may be generated in the quadrant 1102 of user interface 1100 of FIG. 11 as a default view of the allocation of virtual resources. In other aspects, the user interface 1200 may be generated in response to a selection of "Provider" on the selection option 1104. The user interface 1200 corresponds to the view of the virtual resource allocation shown in the quadrant 1102 of the user interface 1100 of FIG. 11.

FIG. 13 is a screenshot of an example of a user interface 1300 showing an allocation of the virtual resources of the client 106 by the operating system associated with the virtual resources. In some aspects, the user interface 1300 may be generated in response to a selection of "OS" on the selection option 1104.

FIG. 14 is a screenshot of an example of a user interface 1400 showing an allocation of the virtual resources of the client 106 by the virtual data center 110A, 110B, 110C on which the virtual resource is provisioned. In some aspects, the user interface 1400 may be generated in response to a selection of "VDC" on the selection option 1104.

Returning to FIG. 11, quadrant 1106 shows an indication of the health of each service provider 108 for the virtual data centers 110A, 110B, 110C where the virtual resources of the client 106 are provisioned. For each service provider 108 listed in the quadrant 1106, the user interface 1100 displays whether the virtual resources of the respective service provider 108 are provisioned on a private cloud or a public cloud. The quadrant 1106 also shows the relative connectivity of each service provider 108 and the relative amount of services, or additional virtual resources, available from each service provider 108.

Quadrant 1108 shows a historical consumption of the virtual resources of the client 106 distributed across each of the virtual data centers 110A, 110B, 110C on which the virtual resources are provisioned. The distribution is displayed as overlapping histograms for the distribution of the virtual resources in each of the virtual data centers 110A, 110B, 110C.

Quadrant 1110 shows a calendar of events related to the virtual resources, the virtual data centers 110A, 110B, 110C, or the providers. In some aspects, the calendar may include selection options to allow the client 106 to view events (e.g., maintenance schedules) for the virtual resources, the virtual data centers 110A, 110B, 110C, or the providers.

Figure 15:
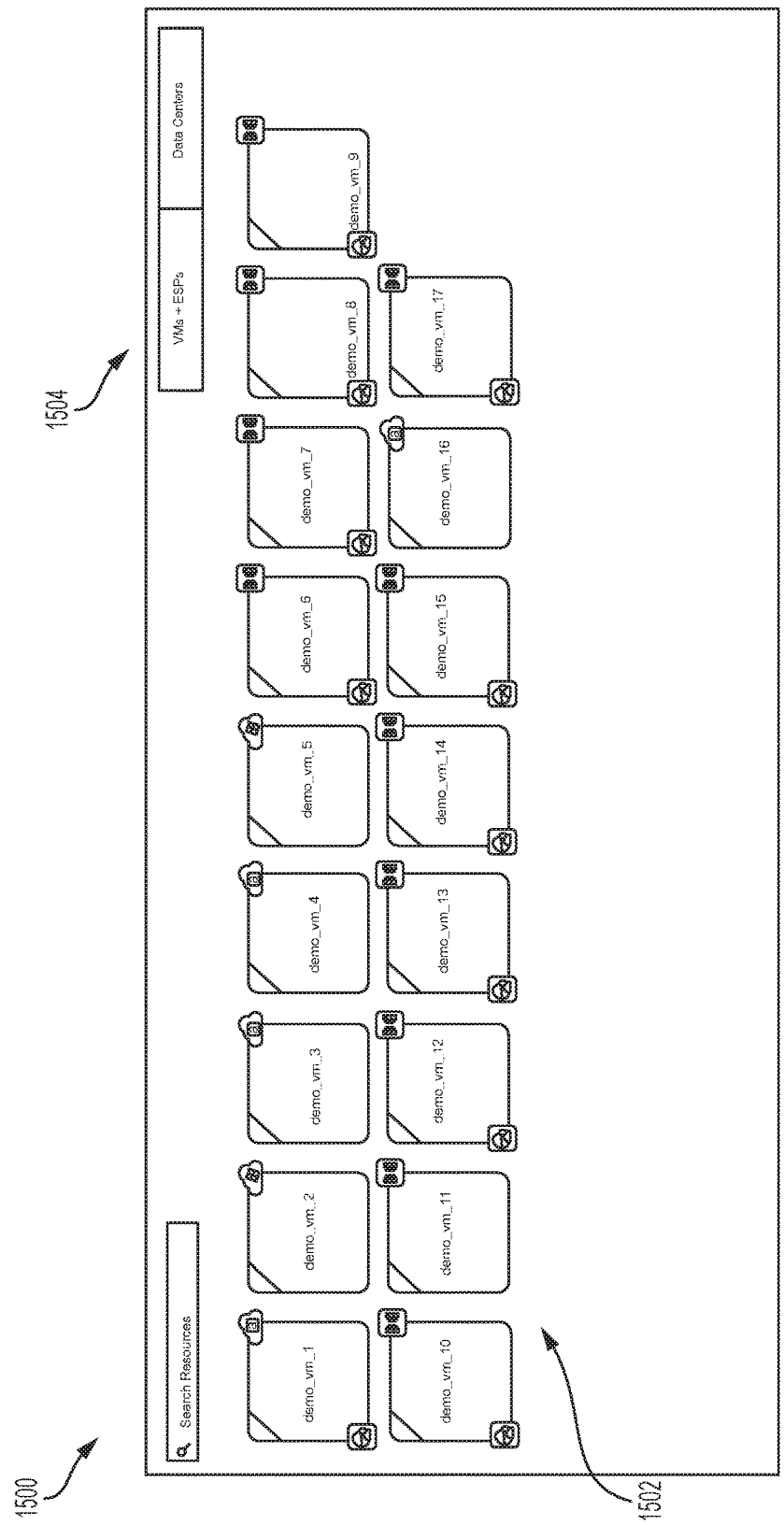
FIG. 15 is a screenshot of an example of a user interface showing icons corresponding to virtual resources associated with the client 106 according to some aspects of the present disclosure.

FIG. 15 is a screenshot of an example of a user interface showing icons 1502 corresponding to virtual resources associated with the client 106. In some aspects, the icons 1502 may correspond to selection options that may be selected by the user. In response to selecting an icon 1502, an additional user interface may be generated, or the user interface 1500 may be modified, to show one or more characteristics of the selected virtual resource. For example, the selection of an icon corresponding to a virtual resource may cause the server device 102 to generate a user interface including, but not limited to, the name, the power state, the virtual data center 110A, 110B, 110C in which it is provisioned, the operating system, the number of CPUs, the RAM, the storage space, the number of hard drives, and the health of the virtual resource. One or more of the characteristics may include a selection option or hyperlink that may be selected to view details concerning the characteristic. The user interface 1500 also includes a selection option 1504 that may be selected by the user to toggle between the user interface 1500 of FIG. 15 and a second user interface sorting the icons corresponding to the virtual resources of the client 106 by based on a characteristic of the corresponding virtual resource.

Figure 16:
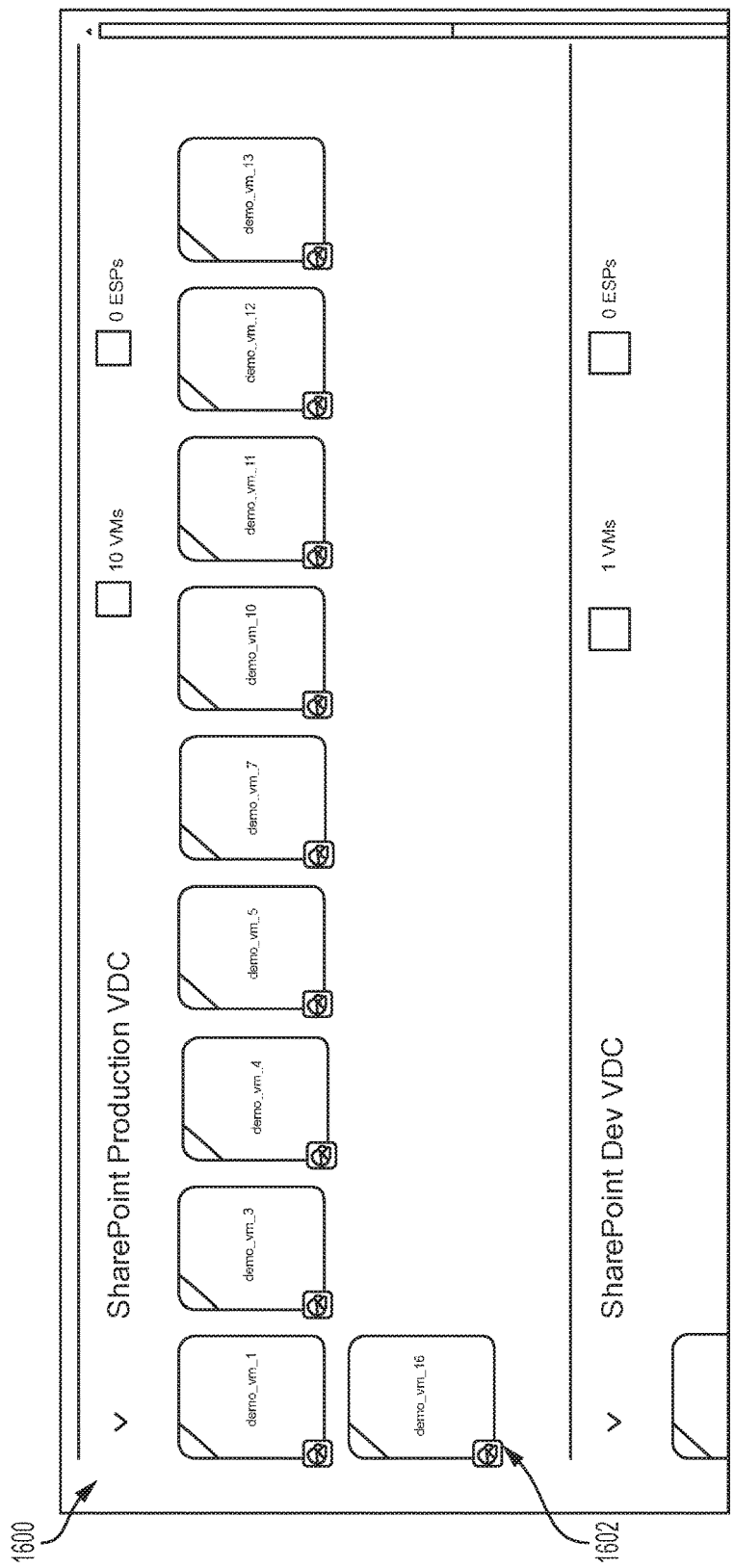
FIG. 16 is a screenshot of an example of a user interface showing icons sorted based on a characteristic of the virtual resources corresponding to the icons according to some aspects of the present disclosure.

FIG. 16 is a screenshot of an example of a user interface 1600 showing icons 1602 sorted based on a characteristic of the virtual resources corresponding to the icons 1602. The icons 1602 are sorted and separated based on the virtual data center 110A, 110B, 110C in which the virtual resources are provisioned.

Active Management

Selection of a virtual resource from the group of virtual resources may also cause the server device 102 to generate a control panel having selection options for active management of the selected virtual resource. In some aspects, in response to a request from a user via a selection option, the server device 102, the management engine 210, or other means for actively modifying a virtual resource may be determined.

Figure 17:
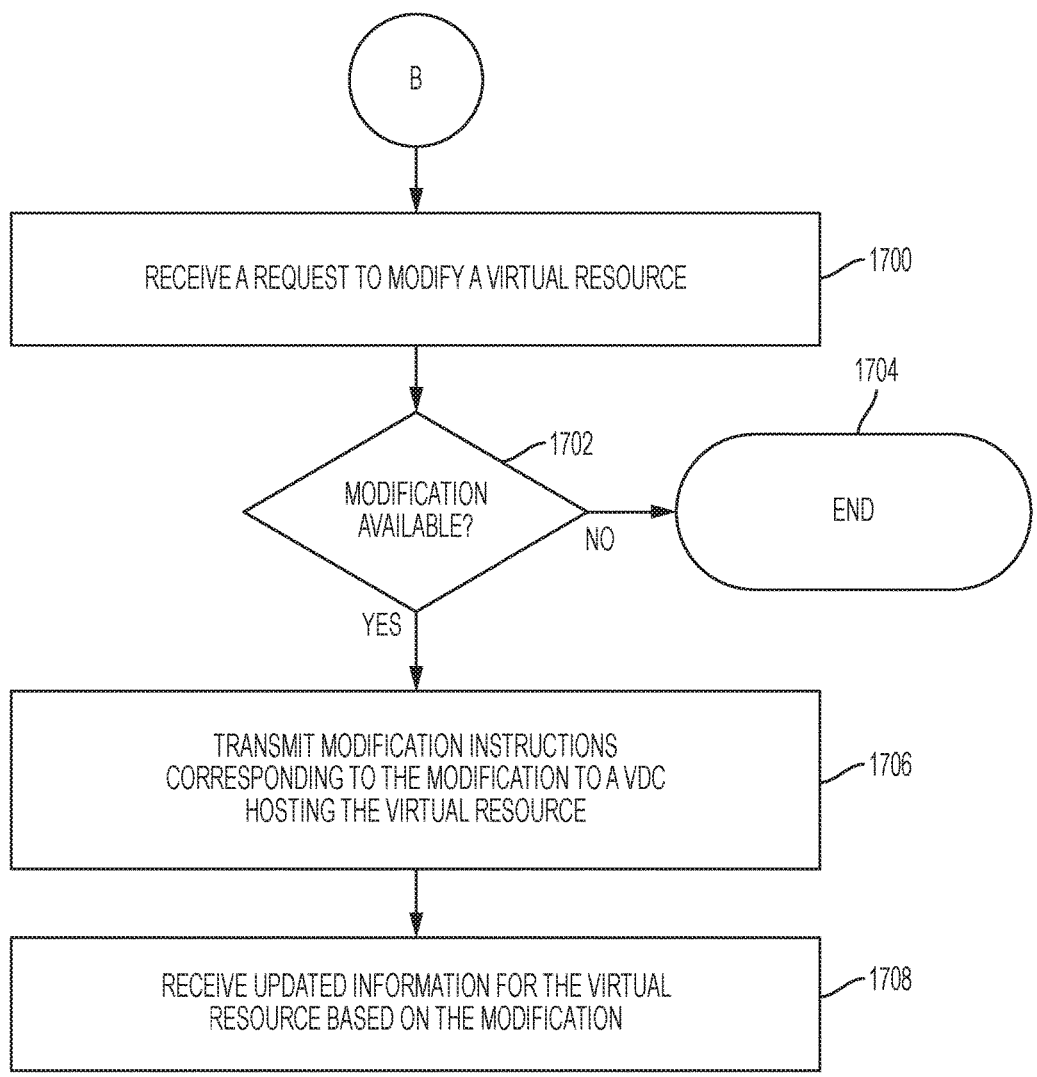
FIG. 17 is a flow chart of a process for modifying a virtual resource provisioned on a virtual data center according to some aspects of the present disclosure.

FIG. 17 is a flow chart of a process for modifying a virtual resource provisioned on a virtual data center according to some aspects of the present disclosure. The process is described with respect to FIGS. 1-3, though other implementations are possible without departing from the scope of the present disclosure.

In block 1700, a request is received from a client 106 to modify a virtual resource. In some aspects, the request may be received by the server device 102 in response to the selection of an option displayed on a user interface. In other aspects, the selection of an option may generate additional user interfaces, or modify the user interface, with selection options or input options to allow the client 106 to select or input a request to modify a virtual resource.

Figure 18:
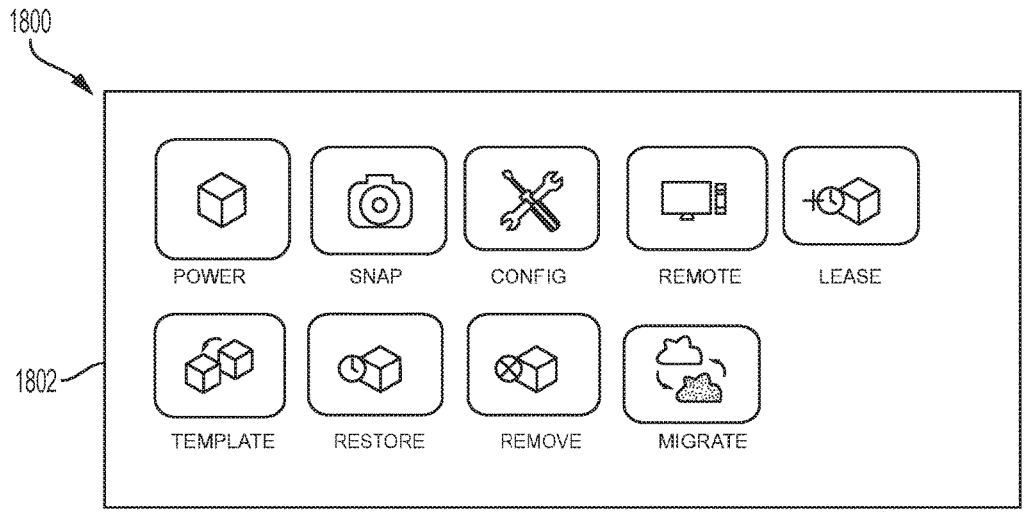
FIG. 18 is a screenshot of a user interface including selection options for modifying a virtual resource according to some aspects of the present disclosure.
Figure 19:
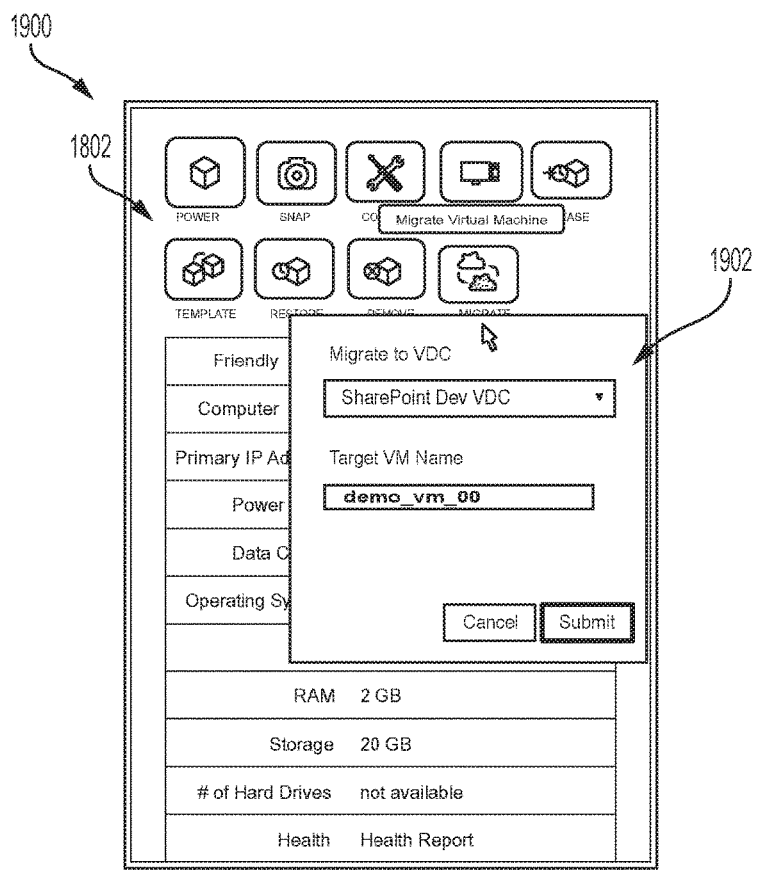
FIG. 19 is a screenshot of a user interface including selection options for tailoring a request to modify a virtual resource according to aspects of the present disclosure.

FIGS. 18-19 are examples of user interfaces that may allow a client 106 to request a modification of a virtual resource. FIG. 18 is a screenshot of a user interface 1800 including a control panel with selection options 1802 for modifying a virtual resource. In some aspects, the control panel with the selection options 1802 may be included in a user interface including selection options corresponding to the virtual resources. For example, the user interface 1800 may be generated in response to a selection of a selection option corresponding to the icon 1502 representing a virtual resource. The user interface 1800 may be generated to allow the selected virtual resource to be modified.

The control panel may include any number of selection options 1802 to allow for active management of the selected virtual resource. For example, the user interface 1800 shows the control panel including the following options:

POWER: This selection option may allow the power state of the selected virtual resource to transition between an "on" state, an "off" state, and a "reset" (power recycle) state.

SNAP: This selection option may allow the client 106 to take a snapshot of the allocation of the selected virtual resource in the virtual data center 110A, 110B, 110C in which it is provisioned and revert the selected virtual resource from a snapshot.

CONFIG: This selection option may allow the client 106 to modify the previously selected customizable components of the selected virtual resource by causing the server device 102 to generate a user interface in a similar manner as described above in block 410 of FIG. 5. This selection option may also allow the client 106 to add storage disks to the virtual resource for increased storage.

REMOTE: This selection option may allow the client 106 to remotely connect to a virtual resource from within the PMC interface. Linux flavor virtual resources may be accessed via Secure Shell ("SSH"). Windows flavor virtual resources may be accessed via Remote Desktop Protocol ("RDP")'.

LEASE: This selection option may allow the client 106 to extend the lease term of the virtual resource.

TEMPLATE: This selection option may allow the client 106 to clone a virtual resource to a template that may be used as a template during the process for generating a virtual resource described with respect to FIG. 3 RESTORE: This selection option may allow the client 106 to restore the selected virtual selection option to a previous stage. This selection option may trigger a notification to a customer backup administrator to store the virtual resource to a previous point in time. REMOVE: This selection option may allow the client 106 to remove or decommission the selected virtual selection option from the virtual data center 110A, 110B, 110C in which it is provisioned. In some aspects, the selection option may be labeled "Decommission."

MIGRATE: This selection option may allow the client 106 to migrate the selected virtual resource between virtual data centers 110A, 110B, 110C that belong to disparate clouds. In some aspects, the client 106 may select a new virtual data center 110A, 110B, 110C for provisioning the selected virtual resource.

In some aspects, the client 106 may select a selection option 1802 corresponding to an action on the control panel. In additional aspects, the client may select a selection option 1802 and a new user interface may be generated to tailor the request. For example, FIG. 19 is an example of a user interface 1900 including an addition interface 1902 with additional options for tailoring a request to modify a virtual resource according to aspects of the present disclosure. The user interface 1900 includes the control panel including the selection options 1802 of FIG. 18. In response to selecting one of the selection options 1802, the additional interface 1902 may be generated. In FIG. 19, the selection option 1802 corresponding to a migration of a virtual resource from one virtual data center 110A, 110B, 110C to another is selected. The additional interface 1902 includes a drop-down box to allow the client 106 to select the virtual data center 110A, 110C to which the virtual resource will be migrated. In some aspects, the list of virtual data centers 110A, 110B, 110C included in the drop-down box may be populated using the inventory management process of FIG. 4 to determine available virtual data centers 110A, 110B, 110C. The additional interface 1902 also includes an input option to allow the client 106 to rename the virtual resource.

Returning to FIG. 17, in block 1702, a determination of whether the modification is available is made. In some aspects, the determination may be based on an inventory management process (e.g., the inventory management process of FIG. 4). For example, in migrating a virtual resource to a new virtual data center 110A, 110B, 110C, an inventory management process may be used to determine whether any other virtual data centers 110A, 110B, 110C are available with sufficient space to provision the virtual resource. In another example, in response to the selection of the "Template" selection option 1802 of FIG. 18, the inventory management process may be used to determine whether the virtual data center 110A, 110B, 110C hosting the virtual resource has sufficient space or is compatible to support a new operating system template. In a third example, a modification of a virtual resource may be pending, causing an additional modification to be unavailable.

In block 1704, in response to determining that the modification requested by the client 106 is unavailable, the process ends.

In block 1706, in response to determining that the modification requested by the client 106 is available, modification instructions corresponding to the modification selected from the selection options 1802 of FIG. 18 are transmitted to the virtual data center 110A, 110B, 110C hosting the virtual resource. The modification instructions may cause the virtual data center 110A, 110B, 110C to modify the virtual resource in accordance with the instructions (e.g., remove the virtual resource from the virtual data center 110A, 110B, 110C in response to an instruction to remove or migrate the virtual resource).

In block 1708, updated information for the virtual resource from the virtual data center 110A, 110B, 110C based on the modification is received. In some aspects, the updated information may be received in the form of a confirmation that the modification of the virtual resource has been performed by the virtual data center 110A, 110B, 110C or provider. In other aspects, the updated information may be received during the normal inventory management process described above in FIG. 4. For example, the server device 102 and virtual data center 110A, 110B, 110C may be in regular communication with respect to the availability information and parameter information for the virtual resource and the updated information may be received by the server device 102 during the regular communication.

In some aspects, a user interface displaying the updated information for the virtual resource may be generated. In additional and alternative aspects, a user interface may be generated to allow the client 106 to view the status of requested modifications (e.g., in progress, canceled, failed, completed).

User Interfaces

The user interfaces generated by the server device 102 may allow for a simple and intuitive user interface for performing the processes described herein. The user interfaces may assist the client 106 in navigating through the provisioning and management of virtual resources as described above in an integrated platform that guides the client 106 through the processes. The simple and intuitive nature of the user interfaces may reduce or eliminate the need for specialized training or limiting the management of the virtual resources to sophisticated clients.

To assist the user in navigating the management and provisioning of the virtual resources, the user interfaces may include a combination of selection options and input options, icons, and textual information to allow the client 106 to provide the client 106 a visual context to what actions may be taken with respect to the virtual resources. In this manner, much of the processes enabled by the user interface, where the client 106 is actively managing or provisioning the virtual resources, are presented as choices via selection options and input options rather than by long and potentially confusing form entries.

For example, the series of user interfaces for provisioning a user interface in the process described above for FIG. 5 include numerous selection options to guide the client 106. The selection options themselves may include textual and graphical representations to assist the client 106 in understanding the choices presented by the selection options. The textual description of the selection options may include detailed information regarding the virtual data centers 110A, 110B, 110C each selection option represents. In some aspects, the selection options may include hyperlinks or other internal selection options for causing the server device 102 to generate an additional message or user interface or to modify the user interface to display additional information concerning the virtual data center 110A, 110B, 110C corresponding to the selection option. In some aspects, certain user interfaces generated by the server device 102 may also include a column summarizing the selected information for the virtual resource to be provisioned. This feature may allow the client 106 to see a real-time summary of the virtual resource to be generated.

Integration

The server device 102 may integrate any number of virtual data centers 110A, 110B, 110C in a hybrid cloud environment. The virtual data centers 110A, 110B, 110C may be located in various environments. For example, both private clouds using third-party software for internal management (e.g., by an IT department of a company) as well as public clouds using third-party software by a service provider (e.g., Amazon®, Microsoft®, Verizon®, etc.) may be communicatively coupled to the server device 102 via the service bus 112. The integration engine may include one or more application program interfaces to interact with third-party application program interfaces from the private and public clouds to normalize the client experience. One or more of the APIs may generate normalized interfaces to allow the client 106 to generate, provision, and manage virtual resources in any of the virtual data centers 110A, 110B, 110C in a similar manner regardless of the respective environments of the virtual data centers 110A, 110B, 110C (e.g., public cloud, private cloud, etc.).

The configuration of the server device 102 between the virtual data centers 110A, 110B, 110C (via the service bus 112) and the client 106 (via the network 104), as shown in FIG. 1, may allow for the generating, provisioning, and managing of virtual resources located in the virtual data centers 110A, 110B, 110C by the client 106 through the server device 102. In some aspects, the service bus 112 may be a proprietary enterprise service bus that is configured to allow the client 106 to securely interface with the virtual resources in the virtual data centers 110A, 110B, 110C by interfacing only through the server device 102 via the network 104 and the user interfaces generated by the processor 200.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. The illustrative examples described above are given to introduce the reader to the general subject matter discussed here and are not intended to limit the scope of the disclosed concepts.

What is claimed is:

1. A system, comprising:
a processor communicatively couplable to a client-computing device of a client and one or more computing devices of one or more service providers; and
a memory device accessible to the processor and including instructions executable by the processor to cause the processor to:
determine a list of available virtual data centers based on a virtual resource, each of the available virtual data centers having one or more pools of computing resources located on the one or more computing devices and having a capacity to provision the virtual resource on a physical resource of a provider-computing device among the one or more computing devices;
provide the list of available virtual data centers to the client for selection;
receive a first selection from the client of a selected virtual data center among the list of available virtual data centers;
determine a list of available operating system templates based on the selected virtual data center, the list of available operating system templates being compatible with the selected virtual data center;
provide the list of available operating system templates to the client for selection;
receive a second selection from the client of a selected operating system template among the list of available operating system templates;
determine a list of available networks within the selected virtual data center;
provide the list of available networks to the client for selection;
receive a third selection from the client of a selected network among the list of available networks; and
generate the virtual resource on the physical resource of the selected virtual data center and configure the virtual resource based on the selected operating system template and the selected network.

2. The system of claim 1, wherein the memory device includes instructions executable by the processor to cause the processor to determine the list of available virtual data centers by receiving availability information from a plurality of virtual data centers communicatively couplable to the processor, the availability information indicating the remaining capacity available on each virtual data center in the plurality of virtual data centers to provision one or more virtual resources.

3. The system of claim 1, wherein the memory device includes additional instructions executable by the processor to cause the processor to modify the virtual resource by:
determining whether a requested modification is available for the virtual resource;
based on determining that the requested modification is available, transmitting modification instructions corresponding to the requested modification to the selected virtual data center hosting the virtual resource; and
in response to a modification of the virtual resource, receiving updated information for the virtual resource based on the modification.

4. The system of claim 3, wherein the requested modification corresponds to a request to migrate the virtual resource from the selected virtual data center to a new virtual data center,
wherein the memory device includes additional instructions to generate a second list of target virtual data centers by retrieving availability information corresponding to each virtual data center to determine the new virtual data center having the capacity to provision the virtual resource, the new virtual data center corresponding to a second provider-computing device separate from the provider-computing device and compatible with the virtual resource.

5. The system of claim 4, wherein the virtual resource includes a virtual machine having data and a state, and wherein the memory device includes instructions executable by the processor to cause the processor to migrate the virtual resource from the virtual data center to the new virtual data center such that the virtual resource maintains at least one of the data or the state as a result of the migration to the new virtual data center.

6. The system of claim 1, wherein the memory device includes additional instructions executable by the processor to cause the processor to analyze a list of virtual resources associated with the client by:
determining a total consumption over an interval of time for different sets of the virtual resources associated with the client, the different sets being defined by a shared characteristic of the virtual resources within each of the different sets; and
generating a user interface including a graph representing the total consumption over time for each of the different sets of the virtual resources associated with the client.

7. The system of claim 1, wherein the memory device includes additional instructions executable by the processor to cause the processor to analyze a list of virtual resources associated with the client by:
determining a total number of virtual resources in different sets of virtual resources associated with the client, the different sets being defined by a shared characteristic of the virtual resources within each of the different sets, the shared characteristics including at least one of a common service provider, a common operating system, or a common virtual data center; and
generating a user interface including a graph representing the total number of virtual resources for each of the different sets of the virtual resources defined by a first shared characteristic, the user interface further including a selection option selectable by the client from the client-computing device to view a different graph representing the total number of virtual resources for each of the different sets of the virtual resources defined by a second shared characteristic.

8. The system of claim 1, wherein virtual resource is generated in accordance with settings selected by the client, the settings including a name for the virtual resource, a decommission term corresponding to a time when the virtual resource is automatically removed from the selected virtual data center, and a backup policy corresponding to an interval of time when characteristic information for the virtual resource is stored in a database.

9. The system of claim 1, wherein the memory device includes instructions executable by the processor to cause the processor to:

determine a setting for the virtual resource based on historical information comprising settings of at least two other virtual resources generated for the client in the past; and
generate the virtual resource in accordance with the setting.

10. The system of claim 1, wherein the memory device includes instructions executable by the processor to cause the processor to:
subsequent to generating the virtual resource, receive a selection of the virtual resource by the client-computing device via a graphical user interface; and
in response to receiving the selection, enable the client-computing device to remotely connect to the virtual resource to control the virtual resource.

11. The system of claim 1, wherein the memory device includes instructions executable by the processor to cause the processor to:
determine a plurality of connectivity statuses and a plurality of service statuses corresponding to the available virtual data centers, each available virtual data center having a respective connectivity-status among the plurality of connectivity statuses and a respective service-status among the plurality of services statuses, wherein the respective connectivity-status indicates connectivity of the available virtual data center, and wherein the respective service-status indicates one or more statuses of one or more services running within the available virtual data center; and
generate a graphical user interface indicating the respective connectivity-status and the respective service-status for each virtual data center among the available virtual data centers.

12. A method comprising:
determining, by a processor, a list of available virtual data centers based on a virtual resource, each of the available virtual data centers having one or more pools of computing resources located on one or more computing devices of one or more service providers and having a capacity to provision a virtual resource on a physical resource of a provider-computing device among the one or more computing devices;
providing, by the processor, the list of available virtual data centers to a client-computing device of a client for selection;
receiving, by the processor, a first selection from the client of a selected virtual data center from among the list of available virtual data centers;
determining, by the processor, a list of available operating system templates based on the selected virtual data center, the list of available operating system templates being compatible with the selected virtual data center;
providing, by the processor, the list of available operating system templates to the client for selection;
receiving, by the processor, a second selection from the client of a selected operating system template among the list of available operating system templates;
determining, by the processor, a list of available networks within the selected virtual data center;
providing, by the processor, the list of available networks to the client for selection;
receiving, by the processor, a third selection from the client of a selected network among the list of available networks; and
generating, by the processor, a secure virtual resource on the physical resource of the selected virtual data center and configuring the secure virtual resource based on the selected operating system template and the selected network.

13. The method of claim 12, wherein:
providing the list of available operating system templates to the client includes generating a first user interface including the list of available operating system templates for selection by the client via the client-computing device, the list of available operating system templates corresponding to one or more operating systems that are compatible with a provider-computing device of the one or more computing devices corresponding to the selected virtual data center; and
providing the list of available networks to the client includes generating a second user interface including the list of available networks within the selected virtual data center for selection by the client via the client-computing device.

14. The method of claim 12, further comprising modifying, by the processor, the secure virtual resource by:
receiving a client request to modify the secure virtual resource;
determining that a requested modification is available for the secure virtual resource;
transmitting modification instructions corresponding to the requested modification to the selected virtual data center hosting the secure virtual resource; and
in response to a modification of the secure virtual resource, receiving updated information for the secure virtual resource based on the requested modification.

15. The method of claim 12, further including analyzing a list of virtual resources associated with the client by:
determining, by the processor, a total consumption over an interval of time for different sets of the virtual resources associated with the client, the different sets being defined by a shared characteristic of the virtual resources within each of the different sets; and
generating, by the processor, a user interface including a graph representing the total consumption over time for each of the different sets of the virtual resources associated with the client.

16. The method of claim 12, further including analyzing a list of virtual resources associated with the client by:
determining, by the processor, a total number of virtual resources in different sets of virtual resources associated with the client, the different sets being defined by a shared characteristic of the virtual resources within each of the different sets, the shared characteristics including at least one of a common service provider, a common operating system, or a common virtual data center; and
generating, by the processor, a user interface including a graph representing the total number of virtual resources for each of the different sets of the virtual resources defined by a first shared characteristic, the user interface further including a selection option selectable by the client from the client-computing device to view a different graph representing the total number of virtual resources for each of the different sets of the virtual resources defined by a second shared characteristic.

17. A non-transitory computer-readable medium comprising program code that is executable by a processor for causing the processor to:
determine a list of available virtual data centers based on a virtual resource, each of the available virtual data centers having one or more pools of computing resources located on one or more computing devices of one or more service providers and having a capacity to provision a virtual resource on a physical resource of a provider-computing device of the one or more computing devices;

provide the list of available virtual data centers to a client-computing device of a client for selection;

receive a first selection from the client of a selected virtual data center among the list of available virtual data centers;

determine a list of available operating system templates based on the selected virtual data center, the list of available operating system templates being compatible with the selected virtual data center;

provide the list of available operating system templates to the client for selection;

receive a second selection from the client of a selected operating system template among the list of available operating system templates;

determine a list of available networks within the selected virtual data center;

provide the list of available networks to the client for selection;

receive a third selection from the client of a selected network among the list of available networks; and generate the virtual resource on the physical resource of the selected virtual data center and configure the virtual resource based on the selected operating system template and the selected network.

18. The non-transitory computer-readable medium of claim 17, further comprising program code that is executable by the processor for causing the processor to:

analyze a plurality of virtual resources associated with the client-computing device; and generate a user interface including one or more graphs including information for different sets of virtual resources from the plurality of virtual resources, the different sets being defined by a shared characteristics of the virtual resources within each of the different sets.

19. The non-transitory computer-readable medium of claim 17, further comprising program code that is executable by the processor for causing the processor to modify the virtual resource to change a characteristic of the virtual resource in response to a request from the client-computing device.

* * * * *